(12) United States Patent
Kim et al.

(10) Patent No.: US 12,039,186 B2
(45) Date of Patent: Jul. 16, 2024

(54) METHOD OF TESTING A SUSPEND OPERATION

(71) Applicant: SAMSUNG ELECTRONICS CO., LTD., Suwon-si (KR)

(72) Inventors: Suyong Kim, Hwaseong-si (KR); Junyong Park, Seoul (KR); Sangbum Yun, Seoul (KR); Ilhan Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 112 days.

(21) Appl. No.: 17/875,569

(22) Filed: Jul. 28, 2022

(65) Prior Publication Data

US 2023/0143341 A1 May 11, 2023

(30) Foreign Application Priority Data

Nov. 11, 2021 (KR) .................. 10-2021-0154730

(51) Int. Cl.
  *G06F 3/06* (2006.01)
(52) U.S. Cl.
  CPC .......... *G06F 3/0653* (2013.01); *G06F 3/0604* (2013.01); *G06F 3/0679* (2013.01)
(58) Field of Classification Search
  CPC .... G06F 3/0653; G06F 3/0679; G06F 3/0659; G06F 3/0619; G06F 3/0604
  See application file for complete search history.

(56) References Cited

U.S. PATENT DOCUMENTS

| | | | |
|---|---|---|---|
| 7,679,133 | B2 | 3/2010 | Son et al. |
| 8,553,466 | B2 | 10/2013 | Han et al. |
| 8,559,235 | B2 | 10/2013 | Yoon et al. |
| 8,654,587 | B2 | 2/2014 | Yoon et al. |
| 9,886,214 | B2 | 2/2018 | Micheloni et al. |
| 10,203,884 | B2 | 2/2019 | Madraswala et al. |
| 10,978,158 | B1 | 4/2021 | Du et al. |
| 10,978,166 | B1 | 4/2021 | Nagao |
| 2005/0180245 | A1 | 8/2005 | Maeda |
| 2011/0233648 | A1 | 9/2011 | Seol et al. |
| 2015/0221381 | A1 | 8/2015 | Nam |
| 2017/0168752 | A1* | 6/2017 | Micheloni .............. G11C 16/32 |

(Continued)

FOREIGN PATENT DOCUMENTS

KR  10-2000-0004733  1/2000

*Primary Examiner* — Tracy A Warren
(74) *Attorney, Agent, or Firm* — F. CHAU & ASSOCIATES, LLC

(57) ABSTRACT

A method of testing a suspend operation, the method including: determining whether to transfer a suspend sampling signal to a suspend command circuit at a time point prior to each of a plurality of suspend operation time points stored in a sequence operation circuit; transferring the suspend sampling signal from the sequence operation circuit to the suspend command circuit; generating an internal suspend operation command based on the suspend sampling signal; transferring the internal suspend operation command from the suspend command circuit to the sequence operation circuit; performing suspend operations for all the plurality of suspend operation time points in response to the internal suspend operation command; and determining whether the suspend operations are performed at all of the suspend operation time points.

20 Claims, 18 Drawing Sheets

(56) References Cited

U.S. PATENT DOCUMENTS

| | | | |
|---|---|---|---|
| 2020/0350029 A1* | 11/2020 | Kim | G11C 16/10 |
| 2021/0335433 A1* | 10/2021 | Harada | G11C 7/04 |
| 2022/0093194 A1* | 3/2022 | Lee | G11C 16/3459 |
| 2022/0139462 A1* | 5/2022 | Du | G11C 7/12 |
| | | | 365/228 |

* cited by examiner

METHOD OF TESTING A SUSPEND OPERATION

CROSS-REFERENCE TO RELATED APPLICATION

This application claims priority under 35 U.S.C. § 119(a) to Korean Patent Application No. 10-2021-0154730 filed on Nov. 11, 2021 in the Korean Intellectual Property Office, the disclosure of which is incorporated by reference herein in its entirety.

TECHNICAL FIELD

The present inventive concept relates to a method of testing a suspend operation.

DISCUSSION OF RELATED ART

A memory device, particularly a nonvolatile memory device, stores or deletes data in memory cells by program and erase operations. A flash memory device is an example of a nonvolatile memory device. When a program and/or erase operation is started, access to the flash memory for data retrieval may not be allowed until the program and/or erase operation is finished, and thus, the performance of the memory system may be degraded. To prevent performance degradation of the memory system, a suspend operation, which temporarily stops a program and/or erase operation, is performed. While the suspend operation is being performed, in other words, while the program and/or erase operations are halted, a read operation is performed, and after the read operation is completed, a resume operation to resume an interrupted program and/or erase operation is performed.

SUMMARY

Example embodiments of the present inventive concept provide a method of testing a suspend operation, which is capable of detecting a defect in a circuit performing a suspend operation and/or a resume operation, by automatically performing the suspend operation and the resume operation at all of set suspend operation time points regardless of a time interval between the suspend operation time points.

According to example embodiments of the present inventive concept, a method of testing a suspend operation includes: determining whether to transfer a suspend sampling signal to a suspend command circuit at a time point prior to each of a plurality of suspend operation time points stored in a sequence operation circuit; transferring the suspend sampling signal from the sequence operation circuit to the suspend command circuit; generating an internal suspend operation command based on the suspend sampling signal; transferring the internal suspend operation command from the suspend command circuit to the sequence operation circuit; performing suspend operations for all the plurality of suspend operation time points in response to the internal suspend operation command; and determining whether the suspend operations are performed at all of the suspend operation time points.

According to example embodiments of the present inventive concept, a method of testing a suspend operation includes: designating a memory cell to perform a programming operation and an erase operation, and determining whether to automatically perform a resume operation after a read operation and the suspend operation on the memory cell; applying a programming command or an erase command; transferring a suspend sampling signal to a suspend command circuit to perform the suspend operation once at each of all suspend operation time points by using a suspend control circuit included in a sequence operation circuit; determining whether the suspend operation is completed at all of the suspend operation time points, using an internal suspend command generated based on the suspend sampling signal; and reading data stored in the memory cell.

According to example embodiments of the present inventive concept, a method of testing a suspend operation includes: setting a number of test cycles to perform a suspend test on a memory device including a memory cell area and a peripheral circuit area; performing a programming operation or an erase operation on the memory cell area; comparing the set number of test cycles with a number of the programming operation or the erase operation; performing the suspend test for all suspend operation time points included in a subsequent operation when the number of the programming operation or the erase operation is greater than the number of test cycles; and determining whether to perform the suspend operation in the peripheral circuit area based on a result of the suspend test.

BRIEF DESCRIPTION OF THE DRAWINGS

The above and other features of the present inventive concept will be more clearly understood from the following detailed description, taken in conjunction with the accompanying drawings, in which.

DETAILED DESCRIPTION OF THE EMBODIMENTS

Hereinafter, example embodiments of the present inventive concept will be described with reference to the accompanying drawings.

Figure 1:
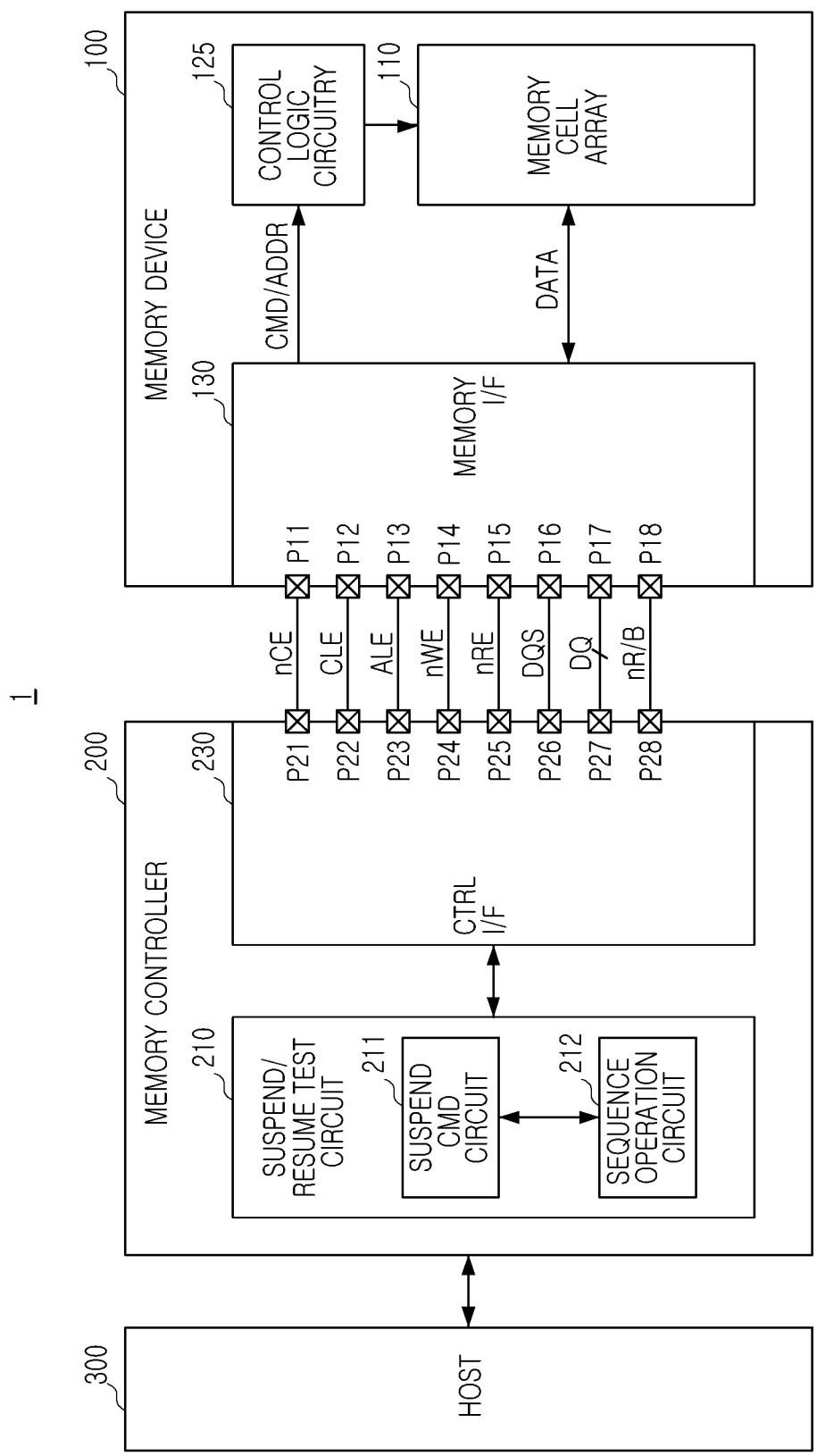
FIG. 1 is a schematic block diagram illustrating a memory system to which a method of testing a suspend operation according to an example embodiment of the present inventive concept is applied.

FIG. 1 is a block diagram schematically illustrating a memory system to which a method of testing a suspend operation according to an example embodiment of the present inventive concept is applied.

Referring to FIG. 1, a memory system 1 to which the method of testing a suspend operation according to an example embodiment of the present inventive concept is applied may include a memory device 100 and a memory controller 200, and may receive an external signal from a host 300.

The memory device 100 may correspond to one of nonvolatile memory devices communicating with the memory controller 200. The memory device 100 may include first, second, third, fourth, fifth, sixth, seventh and eighth pins P11, P12, P13, P14, P15, P16, P17 and P18, a memory cell array 110, a control logic circuitry 125, and a memory interface circuit 130.

The memory interface circuit 130 may receive a command latch enable signal CLE, an address latch enable signal ALE, and a write enable signal nWE from the memory controller 200 through the second to fourth pins P12 to P14. The memory interface circuit 130 may receive a data signal DQ from the memory controller 200 through the seventh pin P17 or transmit the data signal DQ to the memory controller 200. A command CMD, an address ADDR, and data (DATA) may be transmitted through the data signal DQ. For example, the data signal DQ may be transmitted through a plurality of data signal lines. In this case, the seventh pin P17 may include a plurality of pins corresponding to the plurality of data signals DQ.

The memory interface circuit 130 may obtain a command (CMD) from the data signal DQ received in the enable period (e.g., high level state) of the command latch enable signal CLE, based on toggle timings of the write enable signal nWE. The memory interface circuit 130 may obtain the address ADDR from the data signal DQ received in the enable period (e.g., high level state) of the address latch enable signal ALE, based on the toggle timings of the write enable signal nWE.

The write enable signal nWE may maintain a static state (e.g., a high level or a low level) and may then be toggled between a high level and a low level. For example, the write enable signal nWE may be toggled in a period in which the command CMD or the address ADDR is transmitted. Accordingly, the memory interface circuit 130 may acquire the command CMD or the address ADDR based on the toggle timings of the write enable signal nWE.

The memory interface circuit 130 may receive a read enable signal nRE from the memory controller 200 through the fifth pin P15. The memory interface circuit 130 may receive a data strobe signal DQS from the memory controller 200 through the sixth pin P16 or may transmit the data strobe signal DQS to the memory controller 200.

In a data read operation of the memory device 100, the memory interface circuit 130 may receive the read enable signal nRE toggling through the fifth pin P15 before reading the data. The memory interface circuit 130 may generate the data strobe signal DQS toggling based on the toggle of the read enable signal nRE. For example, the memory interface circuit 130 may generate the data strobe signal DQS that starts toggling after a predetermined delay, based on the toggle start time of the read enable signal nRE. The memory interface circuit 130 may transmit the data signal DQ including the data based on the toggle timing of the data strobe signal DQS. Accordingly, the data may be aligned with the toggle timing of the data strobe signal DQS and transmitted to the memory controller 200.

When the data signal DQ including data is received from the memory controller 200 in the data programming operation of the memory device 100, the memory interface circuit 130 may receive the data strobe signal DQS that toggles together with data from the memory controller 200. The memory interface circuit 130 may acquire the data from the data signal DQ based on the toggle timing of the data strobe signal DQS. For example, the memory interface circuit 130 may acquire the data by sampling the data signal DQ at a rising edge and a falling edge of the data strobe signal DQS.

The memory interface circuit 130 may transmit a ready/busy output signal nR/B to the memory controller 200 through the eighth pin P18. The memory interface circuit 130 may transmit state information of the memory device 100 to the memory controller 200 through the ready/busy output signal nR/B. When the memory device 100 is in a busy state (e.g., when internal operations of the memory device 100 are being performed), the memory interface circuit 130 may transmit the ready/busy output signal nR/B indicating a busy state to the memory controller 200. When the memory device 100 is in a ready state (e.g., when internal operations of the memory device 100 are not performed or completed), the memory interface circuit 130 may transmit the ready/busy output signal nR/B indicating a ready state to the memory controller 200.

For example, while the memory device 100 reads data from the memory cell array 110 in response to a page read command, the memory interface circuit 130 may transmit a ready/busy output signal nR/B indicating a busy state (e.g., a low level) to the memory controller 200. Conversely, while the memory device 100 programs the memory cell array 110 with data in response to a programming command, the memory interface circuit 130 may transmit a ready/busy output signal nR/B indicating a busy state to the memory controller 200.

The control logic circuitry 125 may overall control various operations of the memory device 100. The control logic circuitry 125 may receive a command/address CMD/ADDR obtained from the memory interface circuit 130. The control logic circuitry 125 may generate control signals for controlling other components of the memory device 100 according to the received command/address CMD/ADDR. For example, the control logic circuitry 125 may control various control signals for programming the memory cell array 110 with data or reading data from the memory cell array 110.

The memory cell array 110 may include a plurality of memory cells. For example, the plurality of memory cells may be flash memory cells. However, the present inventive concept is not limited thereto, and the memory cells may be a resistive random access memory (RRAM) cell, a ferroelectric random access memory (FRAM) cell, a phase change random access memory (PRAM) cell, a thyristor random access memory (TRAM) cell, or a magnetic random access memory (MRAM) cell. Hereinafter, example embodiments of the present inventive concept will be described with a focus on an embodiment in which the memory cells are NAND flash memory cells.

The memory controller 200 may be configured to control the memory device 100 in response to a request from the host 300. The memory controller 200 may interface the host 300 and the memory device 100. In other words, the memory controller 200 may effectuate information transfer between the host 300 and the memory device 100. The memory controller 200 may program the memory device 100 with data or read data stored in the memory device 100.

The memory controller 200 may include first, second, third, fourth, fifth, sixth, seventh and eighth pins P21, P22, P23, P24, P25, P26, P27 and P28, a suspend/resume test circuit 210, and a controller interface circuit 230. The first to eighth pins P21 to P28 may correspond to the first to eighth pins P11 to P18 of the memory device 100. For example, the first pin P21 may be connected to the first pin P11 and the eighth pin P28 may be connected to the eighth pin P18.

The memory controller 200 may transmit an address ADDR, a programming command CMD, and data to the memory device 100 through the controller interface circuit 230 to input data to the memory device 100. On the other hand, the memory controller 200 may transmit the address ADDR and the read command CMD to the memory device 100 through the controller interface circuit 230 to read data stored in the memory device 100.

In the memory system 1 to which the method of testing a suspend operation according to an example embodiment of the present inventive concept is applied, the suspend/resume test circuit 210 may control a program/erase operation of a selected word line among a plurality of word lines of the memory device 100. The suspend/resume test circuit 210 stops the program/erase operation in response to a search request from the outside, and may resume the program/erase operation with respect to the selected word line or a word line different from the selected word line according to the suspend time from when the program/erase operation is stopped to when it is resumed. For example, the suspend/resume test circuit 210 may stop the program/erase operation in response to a read request from the host 300, and the program/erase operation may resume according to the duration of the suspension.

The suspend/resume test circuit 210 may include a suspend command circuit 211 and a sequence operation circuit 212. For example, the suspend command circuit 211 receives an external suspend command and selectively generates an internal suspend command, and the memory device 100 may be controlled to perform a suspend operation. The sequence operation circuit 212 may control the suspend operation to be performed once for every suspend operation time point.

The memory controller 200 may transmit the address ADDR and the suspend/resume command CMD to the memory device 100 through the controller interface circuit 230, to determine whether the suspend operation and the resume operation performed in the operation of inputting or reading data into the memory device 100 are effectively performed.

The controller interface circuit 230 may transmit a chip enable signal nCE to the memory device 100 through the first pin P21. The controller interface circuit 230 may transmit/receive signals to and from the memory device 100 selected by the chip enable signal nCE, through the second to eighth pins P22 to P28.

The controller interface circuit 230 may transmit the command latch enable signal CLE, the address latch enable signal ALE, and the write enable signal nWE to the memory device 100 through the second to fourth pins P22 to P24. The controller interface circuit 230 may transmit the data signal DQ to the memory device 100 or receive the data signal DQ from the memory device 100 through the seventh pin P27.

The controller interface circuit 230 may transmit, to the memory device 100, a data signal DQ including a command CMD or an address ADDR together with the toggle write enable signal nWE. The controller interface circuit 230 transmits the data signal DQ including the command CMD to the memory device 100 as the command latch enable signal CLE having an enable state is transmitted, and may transmit the data signal DQ including the address ADDR to the memory device 100 as the address latch enable signal ALE having an enable state is transmitted.

The controller interface circuit 230 may transmit the read enable signal nRE to the memory device 100 through the fifth pin P25. The controller interface circuit 230 may receive the data strobe signal DQS from the memory device 100 through the sixth pin P26 or may transmit the data strobe signal DQS to the memory device 100.

The controller interface circuit 230 may receive the ready/busy output signal nR/B from the memory device 100 through the eighth pin P28. The controller interface circuit 230 may determine the state information of the memory device 100 based on the ready/busy output signal nR/B. For example, the controller interface circuit 230 may determine whether a suspend operation performed in the memory device 100 is effectively performed based on the ready/busy output signal nR/B.

In the memory system 1 to which the method of testing a suspend operation according to an example embodiment of the present inventive concept is applied, the controller interface circuit 230 may receive the ready/busy output signal nR/B from the memory controller 200 based on a suspend operation and/or a resume operation for the memory device 100.

As an example, the controller interface circuit 230 may receive the ready/busy output signal nR/B indicating a busy state from the memory controller 200, while the memory device 100 performs a programming operation or an erase operation, for example, before a suspend operation is performed and after a resume operation is performed. On the other hand, the controller interface circuit 230 may receive the ready/busy output signal nR/B indicating a ready state (e.g., high level) from the memory controller 200 before performing the resume operation after performing the suspend operation.

In the memory system 1 to which the method of testing a suspend operation according to an example embodiment of the present inventive concept is applied, the sequence operation circuit 212 may ensure that a programming operation or a read operation is to be performed during the suspend operation, and may ensure that a resume operation is to be performed after a programming operation or a read operation is performed. Accordingly, when the suspend operation is effectively performed, the read operation may be performed between the suspend operation and the resume operation. The controller interface circuit 230 may receive the ready/busy output signal nR/B indicating a busy state even before performing a resume operation after performing a suspend operation, from the memory controller 200.

In the method of testing a suspend operation according to an example embodiment of the present inventive concept, the memory controller 200 may perform the suspend operation for all suspend operation time points. The memory controller 200 may check whether the suspend operation is effectively performed based on the ready/busy output signal nR/B transmitted from the memory interface circuit 130.

Figure 2:
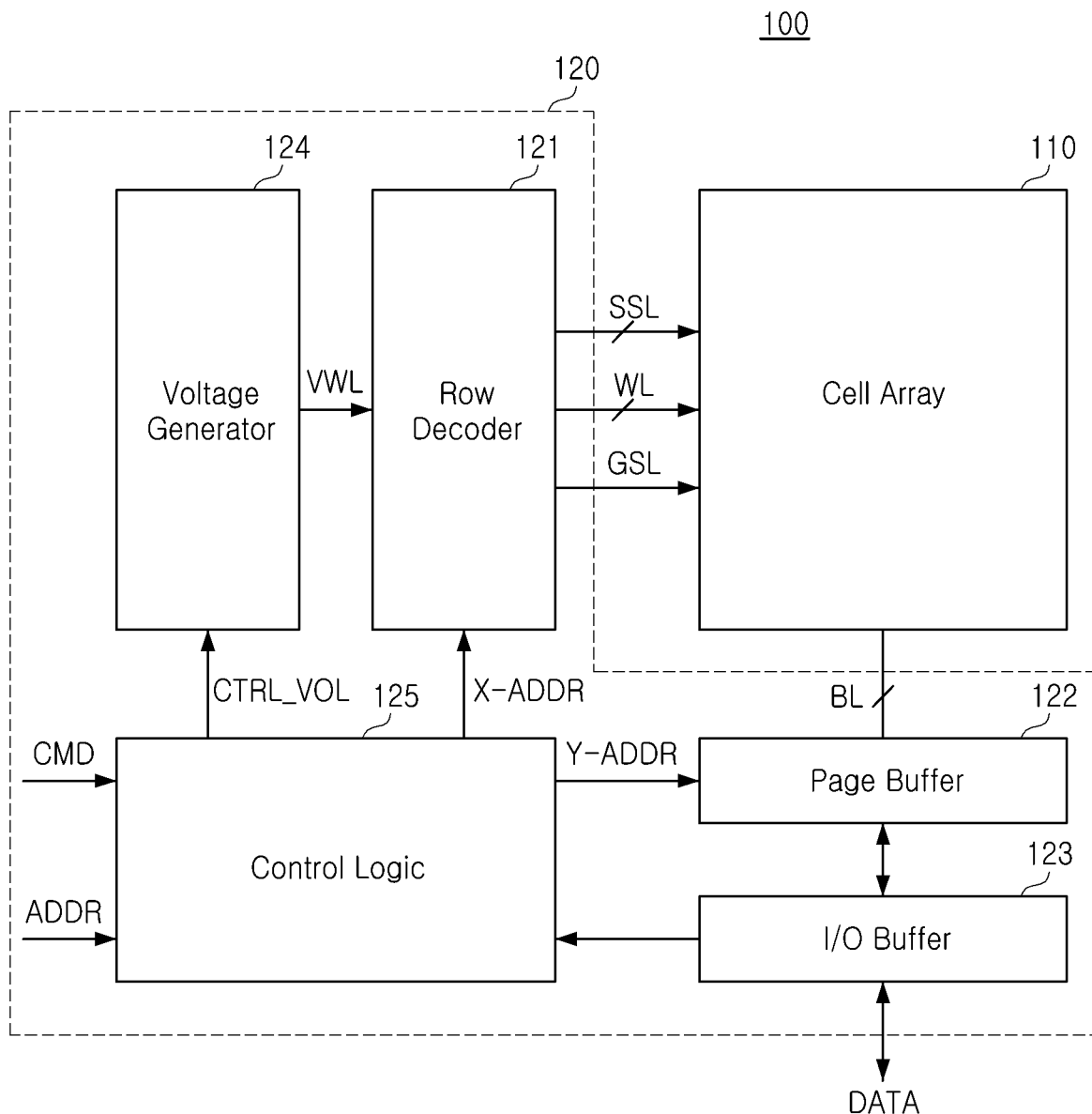
FIG. 2 is a block diagram schematically illustrating a memory device to which a method of testing a suspend operation according to an example embodiment of the present inventive concept is applied.

FIG. 2 is a block diagram schematically illustrating a memory device to which a method of testing a suspend operation according to an example embodiment of the present inventive concept is applied.

Referring to FIG. 2, the memory device 100 may include the memory cell array 110 in which a plurality of memory cells are disposed, and a peripheral circuit area 120 in which a plurality of circuits for controlling operations of a plurality of memory cells are disposed.

The peripheral circuit area 120 may include a row decoder 121, a page buffer 122, an input/output buffer 123, a voltage generator 124, and a control logic circuitry 125. The memory device 100 may further include column logic, a pre-decoder, a temperature sensor, a command decoder, an address decoder, and the like.

The control logic circuitry 125 may control various operations in the memory device 100. The control logic circuitry 125 may output various control signals in response to a command CMD and/or an address ADDR applied through the memory interface circuit 130 illustrated in FIG. 1. For example, the control logic circuitry 125 may output a voltage control signal CTRL_vol, a row address X-ADDR, and a column address Y-ADDR.

In the method of testing a suspend operation according to an example embodiment of the present inventive concept, the control logic circuitry 125 may stop the ongoing program/erase operation in response to the internal suspend command CMD and/or the address ADDR applied through the memory interface circuit 130. The program/erase operation may be stopped at all available suspend operation time points, and the control logic circuitry 125 may receive the resume command CMD and perform a read operation on the memory cell corresponding to the designated address ADDR by receiving the read command CMD until the program/erase operation is resumed.

The memory cell array 110 may include a plurality of memory blocks, and each of the plurality of memory blocks may include a plurality of memory cells. The memory cell array 110 may be connected to the page buffer 122 through bit lines BL, and may be connected to the row decoder 121 through word lines WL, string select lines SSL, and ground select lines GSL In the memory system 1 to which the method of testing a suspend operation according to an example embodiment of the present inventive concept is applied, the memory cell array 110 may include a three dimensional (3D) memory cell array, and the 3D memory cell array may include a plurality of NAND strings. Each NAND string may include memory cells respectively connected to word lines stacked vertically on the substrate. U.S. Pat. Nos. 7,679,133, 8,553,466, 8,654, 587, 8,559,235, and U.S. Patent Application Publication No. 2011/0233648 are incorporated by reference herein in their entireties. For example, the memory cell array 110 may include a two-dimensional (2D) memory cell array, and the 2D memory cell array may include a plurality of NAND strings disposed in row and column directions.

The page buffer 122 may include a plurality of page buffer circuits, and the plurality of page buffer circuits may be respectively connected to memory cells through a plurality of bit lines BL. The page buffer 122 may select at least one bit line among the bit lines BL in response to the column address Y-ADDR. The page buffer 122 may operate as a write driver or a sense amplifier according to an operation mode. For example, during a programming operation, the page buffer 122 may apply a bit line voltage corresponding to data input through the input/output buffer 123 to the selected bit line. During a read operation, the page buffer 122 may sense the current or voltage of the selected bit line to sense data stored in the memory cell, and may output the data through the input/output buffer 123.

The voltage generator 124 may generate various types of voltages for performing program, read, and erase operations based on the voltage control signal CTRL_vol. For example, the voltage generator 350 may generate a program voltage, a read voltage, a program verify voltage, an erase voltage, an erase verification voltage, and the like, as a word line voltage VWL.

The row decoder 121 may select one of the plurality of word lines WL in response to the row address X-ADDR and may select one of the plurality of string select lines SSL. For example, during a programming operation, the row decoder 121 may apply a program voltage and a program verify voltage to a selected word line, and may apply a read voltage to the selected word line during a read operation.

Figure 3:
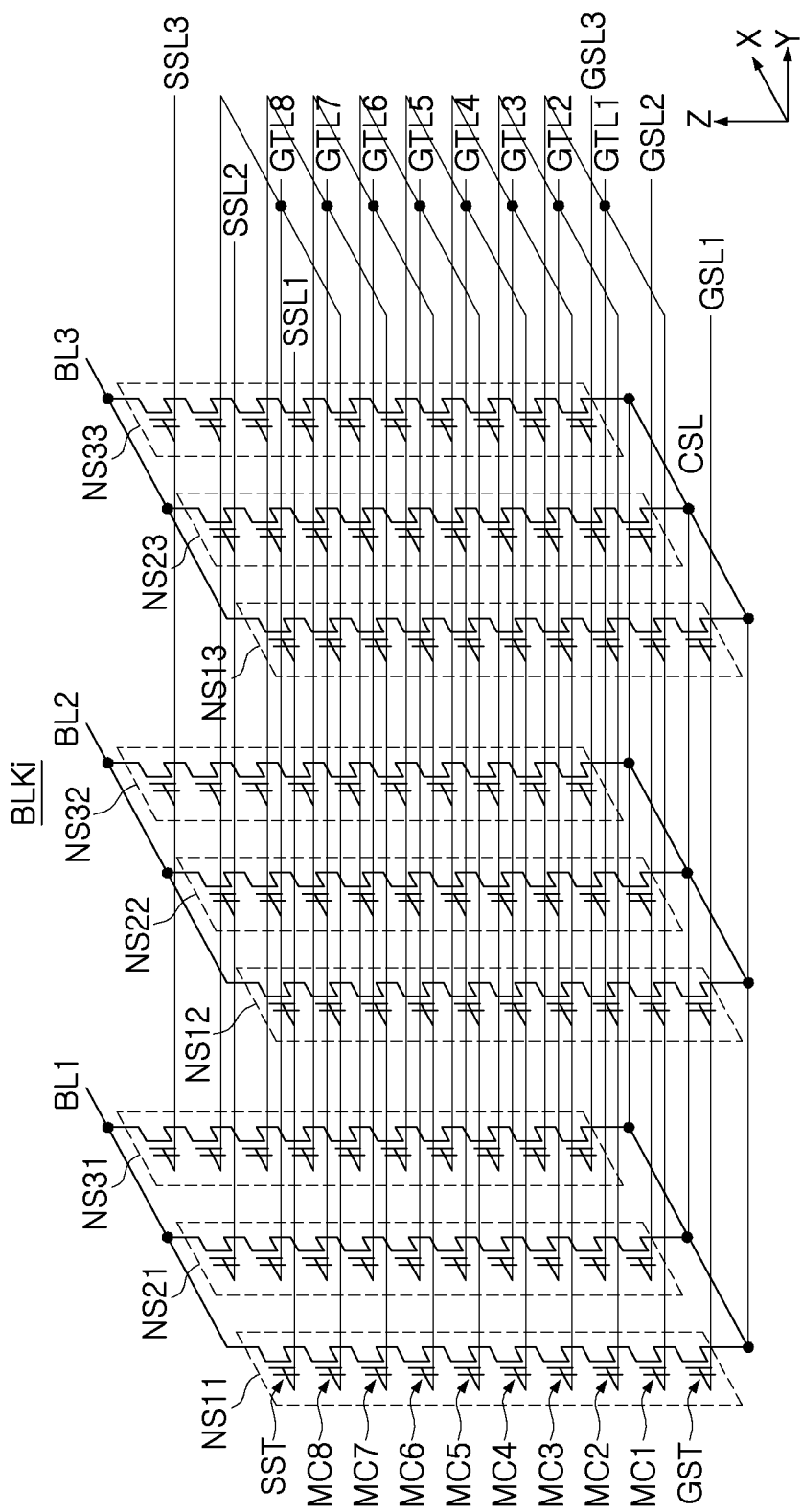
FIG. 3 is a circuit diagram illustrating a structure of a memory cell array included in a memory device to which a method of testing a suspend operation according to an example embodiment of the present inventive concept is applied.

FIG. 3 is a circuit diagram illustrating a structure of a memory cell array included in a memory device to which a method of testing a suspend operation according to an example embodiment of the present inventive concept is applied.

Referring to FIG. 3, when the memory device 100 of the memory system 1 is implemented as a 3D V-NAND type flash memory, each of the plurality of memory blocks included in the memory device 100 may be represented by an equivalent circuit as illustrated in FIG. 3.

A memory block BLKi illustrated in FIG. 3 may represent a 3D memory block formed on a substrate in a 3D structure. For example, a plurality of memory NAND strings included in the memory block BLKi may be formed in a direction perpendicular to the substrate.

Referring to FIG. 3, the memory block BLKi may include a plurality of memory NAND strings NS11, NS12, NS13, NS21, NS22, NS23, NS31, NS32 and NS33 connected between bit lines BL1, BL2, and BL3 and a common source line CSL. Each of the plurality of memory NAND strings NS11 to NS33 may include a string select transistor SST, a plurality of memory cells MC1, MC2, MC3, MC4, MC5, MC6, MC7 and MC8, and a ground select transistor GST. FIG. 3 illustrates that each of the plurality of memory NAND strings NS11 to NS33 includes eight memory cells MC1, MC2, . . . , and MC8, but the configuration is not limited thereto.

The string select transistors SST may be connected to corresponding string select lines SSL1, SSL2, and SSL3. The plurality of memory cells MC1, MC2, . . . , and MC8 may be respectively connected to corresponding gate lines GTL1, GTL2, GTL3, GTL4, GTL5, GTL6, GTL7 and GTL8. The gate lines GTL1, GTL2, . . . , and GTL8 may correspond to word lines, and some of the gate lines GTL1, GTL2, . . . , and GTL8 may correspond to dummy word lines. The ground select transistor GST may be connected to corresponding ground select lines GSL1, GSL2, and GSL3. The string select transistor SST is connected to the corresponding bit lines BL1, BL2, BL3, and the ground select transistor GST may be connected to the common source line CSL.

Figure 8:
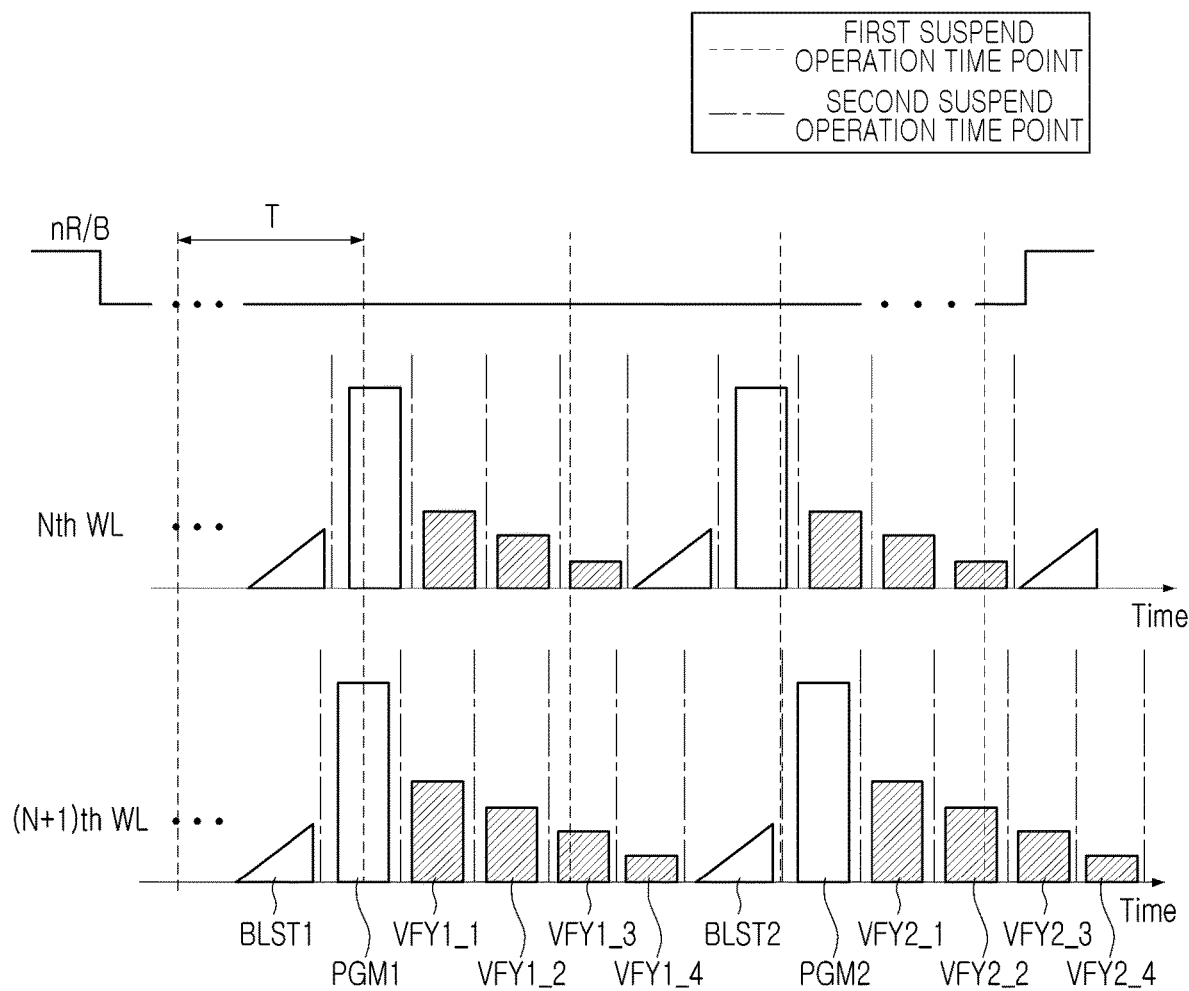
FIG. 8 is a view illustrating a change in a suspend operation time point according to a condition.

Word lines of the same height (e.g., a first word line WL1) may be commonly connected, and the ground select lines GSL1, GSL2, and GSL3 and the string select lines SSL1, SSL2, and SSL3 may be respectively separated from each other. In FIG. 8, the memory block BLKi is illustrated as being connected to eight gate lines GTL1, GTL2, . . . , and GTL8 and three bit lines BL1, BL2 and BL3, but the configuration is not necessarily limited thereto.

Figure 4:
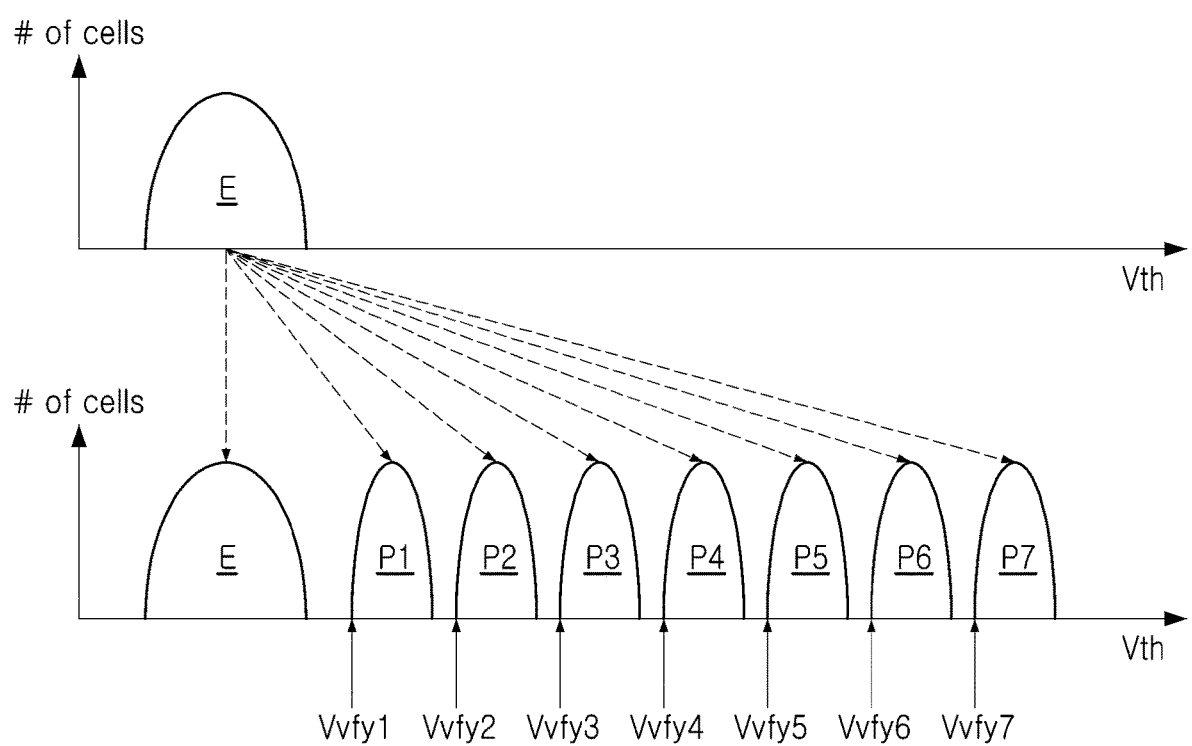
FIG. 4 is a distribution diagram illustrating, by way of example, a threshold voltage distribution of memory cells during a programming operation.
Figure 5:
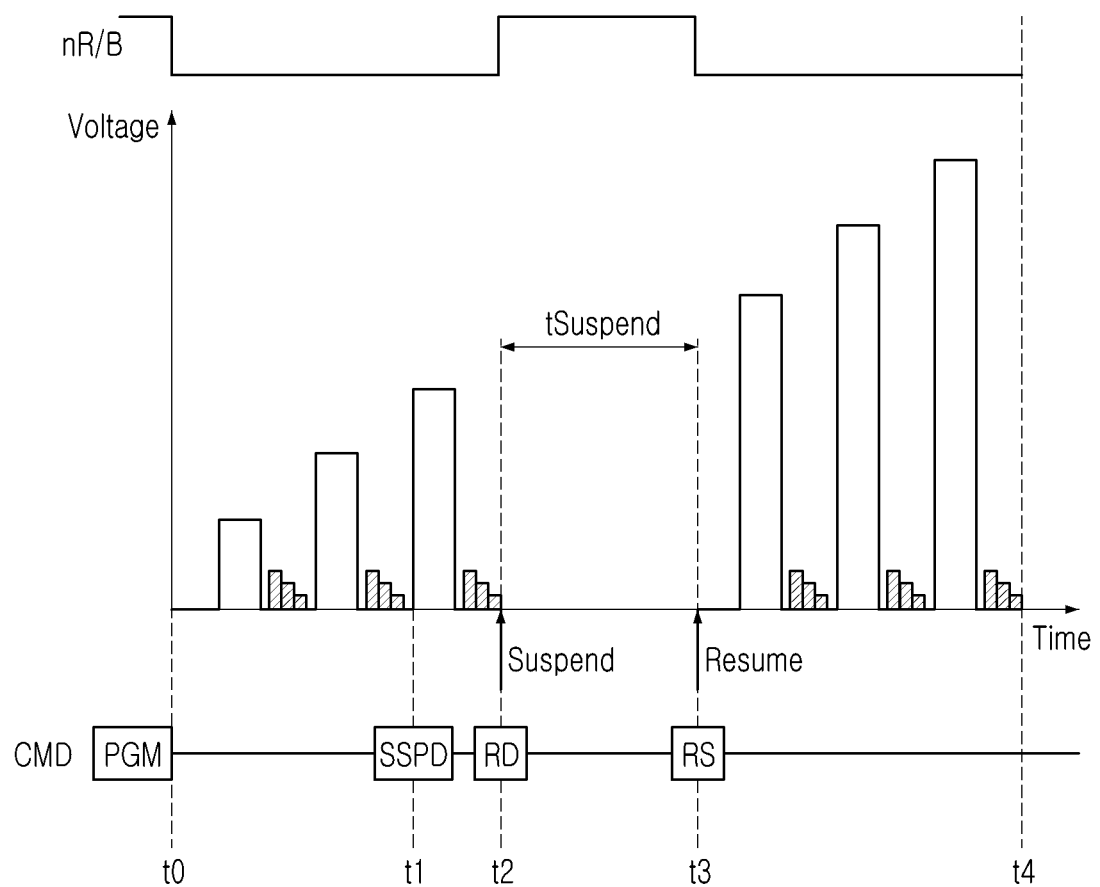
FIG. 5 is a diagram illustrating, by way of example, a programming operation including a suspend operation.

FIG. 4 is a distribution diagram illustrating, by way of example, a threshold voltage distribution of memory cells during a programming operation. FIG. 5 is a diagram illustrating, by way of example, a programming operation including a suspend operation.

Referring to FIG. 4, the horizontal axis may indicate a threshold voltage Vth of the plurality of memory cells, and the vertical axis may indicate the number of the plurality of memory cells. For example, before performing the programming operation, the plurality of memory cells may have an erase state (E). The plurality of memory cells having the erase state E may be programmed to have one of the erase state E and first, second, third, fourth, fifth, sixth and seventh program states P1, P2, P3, P4, P5, P6 and P7 through a programming operation.

A programming operation of the memory device 100 may be performed in a plurality of loops. For example, a plurality of memory cells included in the memory device 100 may be programmed to have one of the erase state E and the first to seventh program states P1 to P7 through a plurality of program loops.

Referring to FIG. 5 together with FIG. 4, each of the plurality of program loops may include a programming operation in which a program voltage is applied and a program verification operation in which program verify voltages Vvfy1, Vvfy2, Vvfy3, Vvfy4, Vvfy5, Vvfy6 and Vvfy7 are applied. Each of the plurality of program loops may further include a bit line setup operation in which a bit line setup voltage is applied before the programming operation.

For example, in any one program loop, after a first program voltage is applied, the program verify voltages Vvfy1 to Vvfy7 for verifying the program state of the memory cells may be sequentially applied. When any one of the sequentially applied program verify voltages Vvfy1 to Vvfy7 is applied and a memory cell is determined as an off cell, the corresponding memory cell may be considered as having passed the verification.

The program verify voltages Vvfy1 to Vvfy7 illustrated in FIG. 5 are illustrated as being applied in the order of a verification voltage having a high magnitude to a verification voltage having a low magnitude, but this is only an example and the present inventive concept may not be limited thereto. For example, in FIG. 5, the verification voltages may correspond to the decreasing bars adjacent to the wider program bar.

Memory cells that have passed verification by the program verify voltages Vvfy1 to Vvfy7 may be determined to have a target program state, and may be program exhibited in a subsequent program loop.

To perform a programming operation on the remaining memory cells except for the program-prohibited memory cells in the subsequent program loop, a second program voltage higher than the first program voltage may be applied. After the second program voltage is applied, a program verification operation in which the program verify voltages Vvfy1 to Vvfy7 are applied may be performed in the same manner as in the previous program verification operation.

On the other hand, as described above, an access operation for data retrieval may be requested from the host 300 during a programming operation of the memory device 100. In this case, the memory controller 200 may output an internal suspend command to stop the programming operation of the memory device 100. The memory controller 200 may apply a read command to the memory device 100 to perform a read operation for data retrieval, and after the read operation is completed, the programming operation of the memory device 100 may be resumed by outputting a resume command.

Referring to FIGS. 1 and 5 together, when a program request from the host 300 occurs, the memory controller 200 may apply a programming command PGM CMD to the memory device 100. The programming command PGM CMD may be provided together with an address ADDR of a memory cell to be programmed.

In general, the suspend operation may not be performed at all available suspend operation time points. For example, the suspend operation may be performed in a predetermined time unit. However, this is only an example and the present inventive concept may not be limited thereto. In FIG. 5, in a programming operation including a plurality of program loops, a suspend operation may be performed at a time t2, and a resume operation may be performed at a time t3.

At time t0, the memory device 100 may output the ready/busy signal nR/B at a low level to transmit the busy state externally. For example, the low level ready/busy signal nR/B may be provided to the memory controller 200. While the ready/busy signal nR/B is maintained at a low level, the memory device 100 may perform a portion of a programming operation. Accordingly, the memory device 100 may perform a plurality of program loops in which the program voltage and the program verify voltage are applied to the word line of the selected memory cell while outputting the ready/busy signal nR/B in the busy state.

While a programming operation is being performed in the memory device 100, the host 300 may request the memory controller 200 to retrieve data. The memory controller 200 may apply an internal suspend command SSPD CMD to the memory device 100 at time t1.

At time t2, the memory device 100 may perform a suspend operation in which the programming operation is temporarily stopped in response to the internal suspend command SSPD CMD. At this time, the memory device 100 may change the ready/busy signal nR/B to a high level to transmit the ready state in which no programming operation is performed externally.

In addition, at time t2, the memory controller 200 may apply a read command RD CMD and an address ADDR of a memory cell in which a read operation is to be performed, to the memory device 100 for data retrieval. Accordingly, the memory device 100 may perform a read operation on the memory cell in response to the read command RD CMD. The read operation may be performed during the suspend time tSuspend, and the memory controller 200 may receive the read data of the memory device 100 by toggling the read enable signal nRE while the read operation is being performed.

When the read operation is completed at time t3, the memory controller 200 may apply a resume command RS CMD to the memory device 100. The memory device 100 may change the ready/busy signal nR/B to a low level in response to the resume command RS MCD to transfer the busy state externally, and may perform a resume operation to resume the interrupted programming operation. After the resume operation is performed, the interrupted programming operation may be resumed and completed at time t4.

Figure 6:
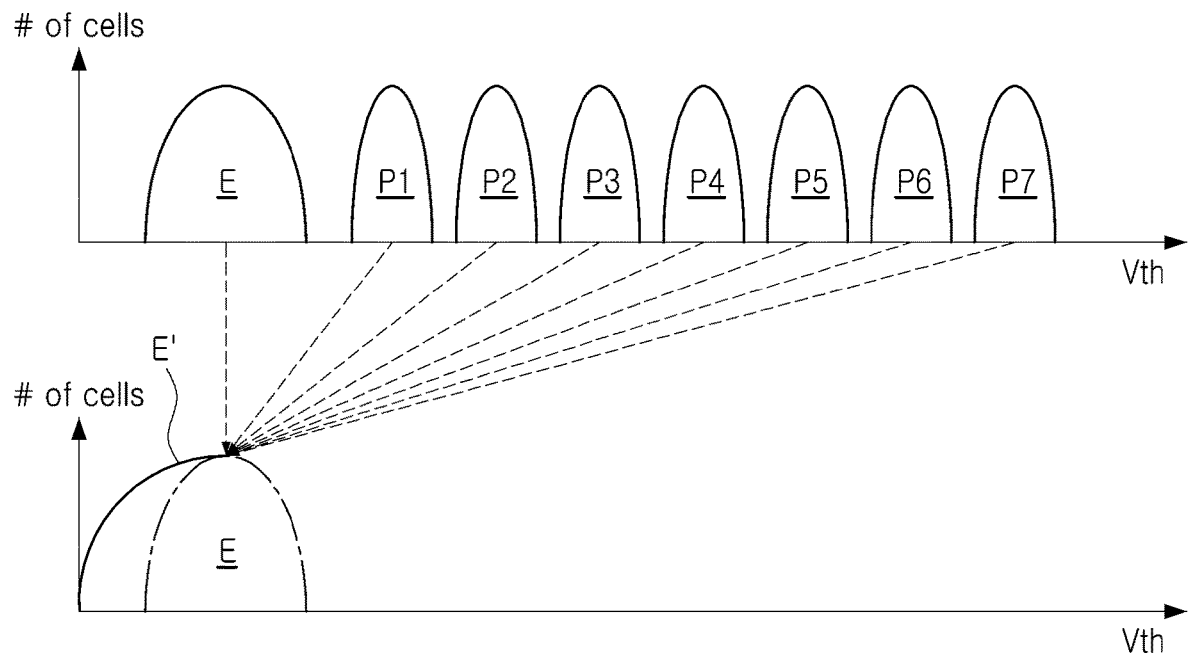
FIG. 6 is a distribution diagram illustrating, by way of example, a threshold voltage distribution of memory cells during an erase operation.
Figure 7:
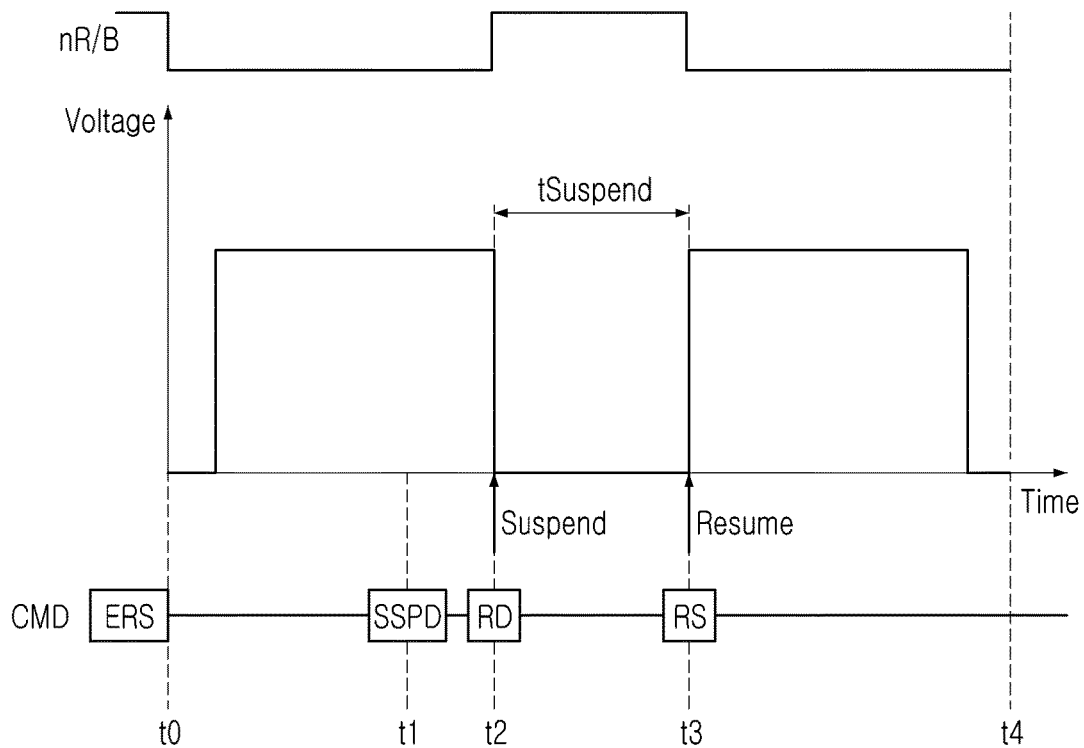
FIG. 7 is a diagram illustrating, by way of example, an erase operation including a suspend operation.

FIG. 6 is a distribution diagram illustrating, by way of example, a threshold voltage distribution of memory cells during an erase operation. FIG. 7 is a diagram illustrating, by way of example, an erase operation including a suspend operation.

Referring to FIG. 6, the horizontal axis may indicate a threshold voltage Vth of the plurality of memory cells, and the vertical axis may indicate the number of the plurality of memory cells. For example, before performing the erase operation, the plurality of memory cells may have one of the first to seventh program states P1 to P7. A plurality of memory cells having one of the first to seventh program states P1 to P7 may have a first erase state (E') or a second erase state (E) through the erase operation.

Similar to the programming operation, the erase operation of the memory device 100 may be performed in a plurality of loops. For example, a plurality of memory cells included in the memory device 100 may be programmed to have a first erase state E' or a second erase state E through a plurality of erase loops.

Referring to FIGS. 1 and 7 together, an erase operation of the memory device 100 is briefly illustrated as applying an erase voltage, but this is only an example embodiment and the present inventive concept may not be limited thereto. As an example, the erase operation may include a pre-programming operation in which a pre-program voltage is applied, a ramping operation in which the erase voltage is ramped, an erase operation in which an erase voltage is applied, an erase verification operation in which an erase verification voltage is applied, and an erase protection code execution operation in which a defense code for the erased memory cell is executed.

For example, the memory device 100 may perform a pre-programming operation before performing a plurality of erase loops. According to the pre-programming operation, a program voltage may be applied to the word lines and a pass voltage may be applied to the ground select line and the string select line. The pre-programming operation may increase threshold voltages of memory cells included in the memory block on which the erase operation is to be performed. Accordingly, the memory cells on which the erase operation has been performed may have a threshold voltage distribution in the second erase state (E) rather than the first erase state (E'). The threshold voltage distribution of the second erase state E may be further improved than the threshold voltage distribution of the first erase state E'.

An access operation for data retrieval may be requested from the host 300 during an erase operation of the memory device 100. In this case, the memory controller 200 may output an internal suspend command to stop the erase operation of the memory device 100. The memory controller 200 may apply a read command to the memory device 100 to perform a read operation for data retrieval, and after the read operation is completed, the erase operation of the memory device 100 may be resumed by outputting a resume command.

Referring to FIGS. 1 and 7 together, when an erase request from the host 300 occurs, the memory controller 200 may apply an erase command ERS CMD to the memory device 100. The erase command ERS CMD may be provided together with the address ADDR of the erase memory block.

For example, the suspend operation during the erase operation may be performed in a predetermined time unit like the suspend operation during the programming operation. However, this is only an example and the present inventive concept may not be limited thereto. In the erase operation illustrated in FIG. 7, the suspend operation may be performed at time t2, and the resume operation may be performed at time t3.

At time t0, the memory device 100 may output the ready/busy signal nR/B at a low level to transmit the busy state externally. While the ready/busy signal nR/B is maintained at a low level, the memory device 100 may perform a portion of an erase operation. Accordingly, while outputting the ready/busy signal nR/B in a busy state, the memory device 100 may perform a plurality of erase loops in which an erase voltage and an erase verification voltage are applied to a memory block undergoing an erase operation.

While an erase operation is being performed in the memory device 100, the host 300 may request a data search from the memory controller 200. The memory controller 200 may apply the internal suspend command SSPD CMD to the memory device 100 at time t1.

At time t2, the memory device 100 may perform a suspend operation by temporarily stopping the erase operation in response to the internal suspend command SSPD CMD. At this time, the memory device 100 may change the ready/busy signal nR/B to a high level to transmit the ready state in which no erase operation is performed externally.

In addition, at time t2, the memory controller 200 may apply a read command RD CMD and an address ADDR of a memory cell in which a read operation is to be performed to the memory device 100 for data retrieval. Accordingly, the memory device 100 may perform a read operation on the memory cell in response to the read command RD CMD. The memory controller 200 may receive the read data of the memory device 100 by toggling the read enable signal nRE while the read operation is being performed.

When the read operation is completed at time t3, the memory controller 200 may apply the resume command RS CMD to the memory device 100. The memory device 100 may transfer the busy state to the outside by changing the ready/busy signal nR/B to a low level in response to the resume command RS MCD, and may perform a resume operation for resuming the interrupted erase operation. After the resume operation is performed, the interrupted erase operation may be resumed and completed at time t4.

Referring to FIGS. 4 to 7, a method of testing a suspend operation according to an example embodiment of the present inventive concept may be a method for inspecting whether a circuit performing the above-described suspend/resume operation among a plurality of circuits included in the peripheral circuit area 120 is defective. In other words, the method may determine if one of the voltage generator 124, the row decoder 121, the control logic 125, the page buffer 122 and the I/O buffer 123 is defective. The method of testing a suspend operation may determine times when a valid suspend/resume operation is not performed among a plurality of timing points of the suspend operation.

A suspend/resume operation performed during a programming operation and/or an erase operation of the memory device 100 may directly affect program and/or erase performance of the memory device 100. Accordingly, the suspend operation may not be performed at points in time when a valid suspend/resume operation cannot be performed. However, this is only an example and the present inventive concept is not limited thereto. For example, when a defect is detected in the circuit that performs the suspend/resume operation, control may be performed such that the corresponding memory device 100 performs a programming operation and/or an erase operation without a suspend operation.

FIG. 8 is a diagram illustrating a change in a suspend operation time according to a condition.

Referring to FIG. 8, a plurality of suspend operations may be performed during a programming operation on the memory device 100. A programming operation may include a plurality of program loops, and each of the plurality of program loops may include a bit line setup operation (BLST1, BLST2), a programming operation (PGM1, PGM2), and a plurality of program verification operations (VFY1_1, VFY1_2, VFY1_3, VFY1_4, VFY2_1, VFY2_2, VFY2_3, VFY2_4). For example, a suspend operation and a resume operation may be performed between respective operations. For example, a suspend operation may be performed between adjacent verification operations or between a program operation and a verification operation.

To determine whether the plurality of suspend operations are effectively performed, it may be necessary to consider a plurality of suspend operation time points under various conditions. The suspend operation inspection may be executed to inspect whether circuits used to perform the suspend operation and the resume operation among a plurality of circuits included in the peripheral circuit area 120 of the memory device 100 are defective.

The inspection of the circuits, which the suspend operation and the resume operation, may be necessary to determine whether the circuits normally operate at each operation time point. However, when additional multiplexers (MUXs) are disposed in the circuit used to determine the suspend operation, in preparation for the inspection range in which the suspend operation inspection is performed, the circuit area may be significantly increased by the multiplexers (MUX), and thus, the effectiveness of the circuit may decrease.

In addition, the suspend operation time and the resume operation time may vary depending on conditions. For example, the points in time at which specific signals are applied to the word lines WL included in the memory device 100 may be different. Accordingly, the suspend operation time and the resume operation time may vary depending on the word line WL.

Accordingly, the suspend operation test may be performed by setting first suspend operation time points at which the suspend operations may be inspected. For example, the first suspend operation time points may be time points spaced apart by the same time (T) interval. However, when the suspend operation determination is performed at the first suspend operation time points, the reliability of the test may be lowered because the test for the entire suspend operation cannot be performed. In other words, the suspend operation determination is performed at fewer suspend operation time points.

In the method of testing a suspend operation according to an example embodiment of the present inventive concept, by automatically performing the suspend operation at all of the set second suspend operation time points regardless of the time interval between the suspend operation time points, the test for all suspend operations may be performed. Accordingly, the time interval between the second suspend operation time points may not be constant. However, this is only an example and the present inventive concept may not be limited thereto.

Although FIG. 8 illustrates only the programming operation, the above content may also be applied to the erase operation in which the suspend operation and the resume operation are performed. For example, the method of testing a suspend operation according to an example embodiment of the present inventive concept may effectively inspect the suspend operations performed in the erase operation as well as the programming operation.

Figure 9:
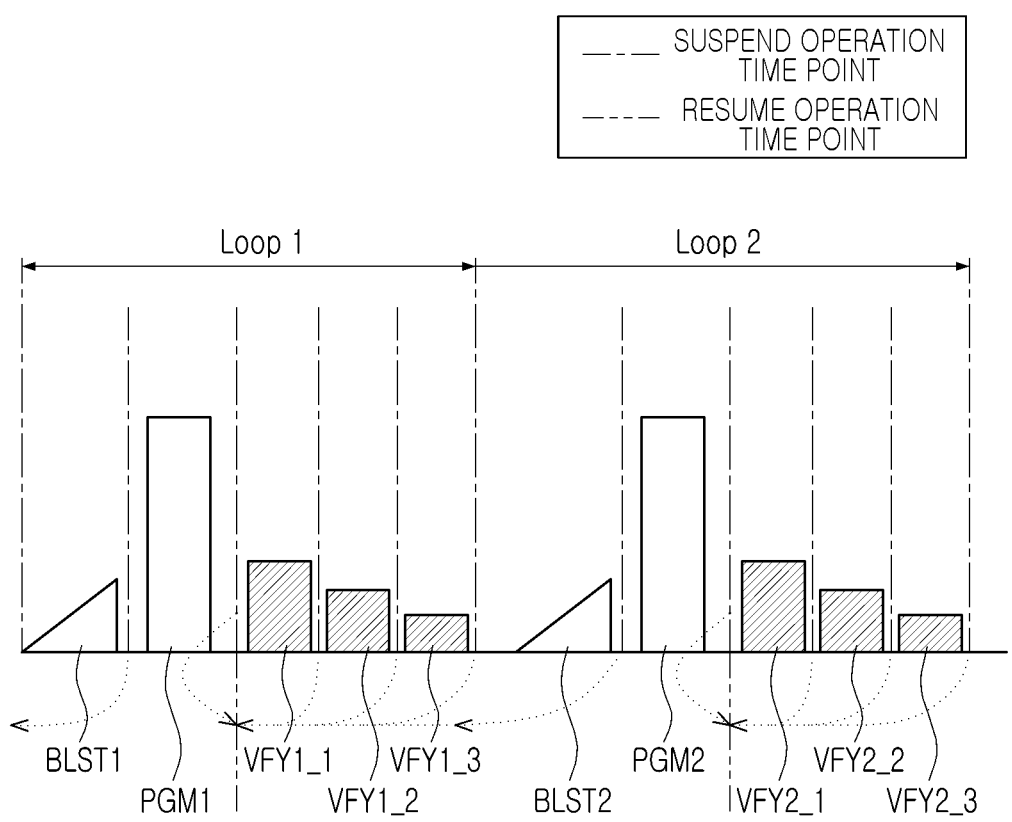
FIG. 9 is a view illustrating a resume operation time point for each suspend operation time point in a method of testing a suspend operation according to an example embodiment of the present inventive concept.
Figure 10:
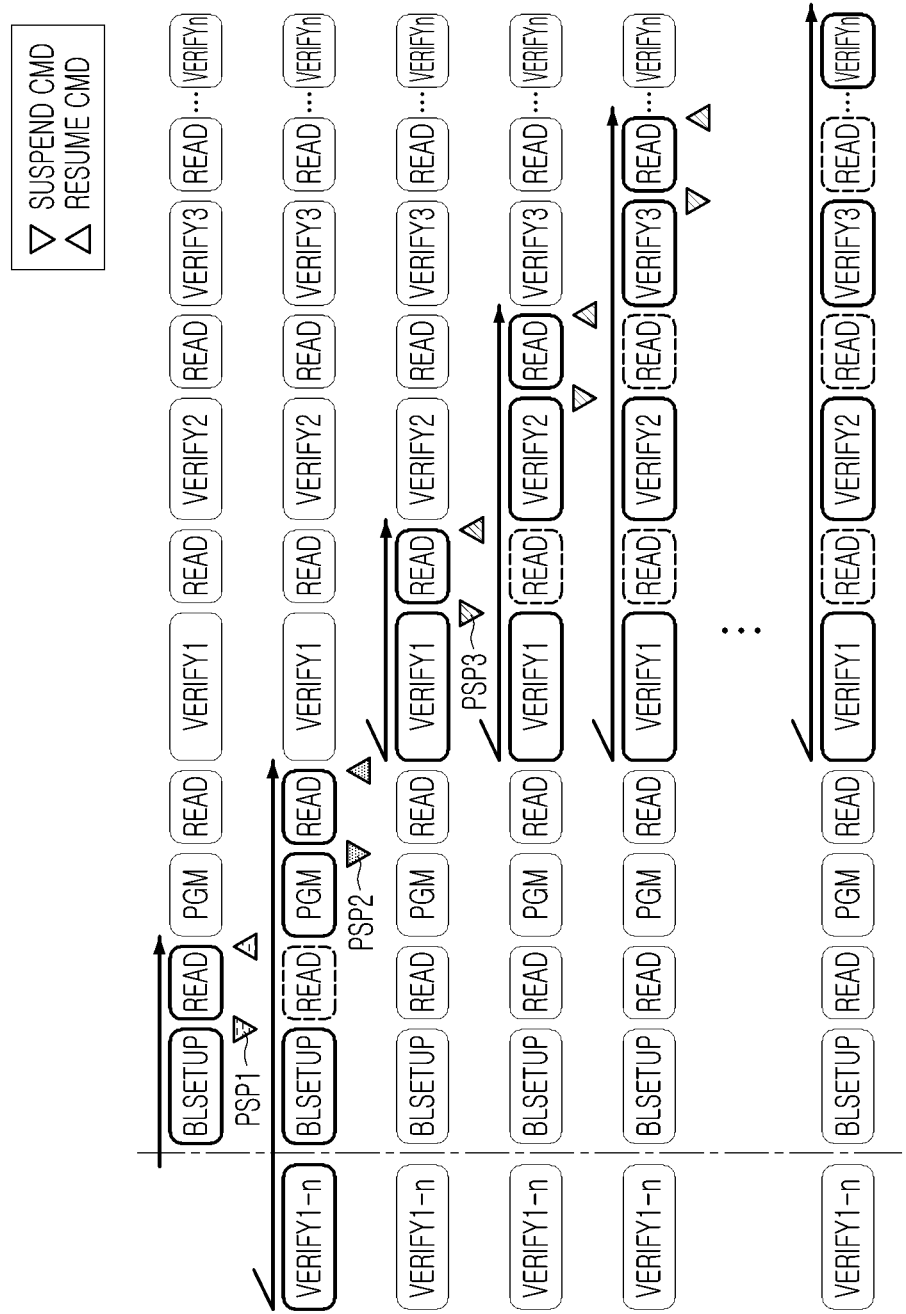
FIG. 10 is a diagram illustrating, by way of example, a case in which a method of testing a suspend operation according to an example embodiment of the present inventive concept is applied to a programming operation.

FIG. 9 is a view illustrating a resume operation time point for each suspend operation time point in a method of testing a suspend operation according to an example embodiment of the present inventive concept. FIG. 10 is a diagram illustrating, by way of example, a case in which the method of testing a suspend operation according to an example embodiment of the present inventive concept is applied to a programming operation.

Referring to FIGS. 9 and 10, a programming operation may be composed of a plurality of program loops Loop1 and Loop2. Each of the plurality of program loops may include performing bit line setup (BLSETUP), applying a program voltage (PGM), and applying program verify voltages (VERIFY1, VERIFY2, VERIFY3, . . . , and VERIFYn). Although two loops are illustrated in FIG. 9, this is only an example and the present inventive concept may not be limited thereto.

The suspend operation time points in the programming operation may include a first program suspend operation time point PSP1, a second program suspend operation time point PSP2, and a third program suspend operation time point PSP3.

For example, the first program suspend operation time point PSP1 may be after bit line setup is performed. For example, at the first program suspend operation time point PSP1 that is after the bit line setup voltages BLST1 and BLST2 are applied and before the program voltages PGM1 and PGM2 are applied, the memory controller 200 may apply an internal suspend command to the memory device 100 to perform a suspend operation.

The second program suspend operation time point PSP2 may be after the program voltages PGM1 and PGM2 are applied. For example, at the second program suspend operation time point PSP2 that is after the program voltages PGM1 and PGM2 are applied and before the first program verify voltages VFY1_1 and VFY2_1 is applied, the memory controller 200 may apply an internal suspend command to the memory device 100 to perform a suspend operation.

A plurality of third program suspend operation time points PSP3 may be after the plurality of program verify voltages VFY1_1, VFY1_2, VFY1_3, VFY2_1, VFY2_2, and VFY2_3 are applied respectively. For example, at the third program suspend operation time point PSP3 that is between the time points when the program verify voltages VFY1_1, VFY1_2, VFY1_3, VFY2_1, VFY2_2, and VFY2_3 are sequentially applied, the memory controller 200 may apply an internal suspend command to the memory device 100 to perform a suspend operation.

Referring to FIG. 9, in a method of testing a suspend operation according to an example embodiment of the present inventive concept, a resume operation time point corresponding to the second program suspend operation time in the first loop (Loop1), resume operation time points corresponding to a plurality of respective third program suspend operations in the first loop (Loop1), and a resume operation time point corresponding to the first program suspend operation in a subsequent second loop (Loop2) may be identical to each other. This can be seen by the dotted lines between the second program suspend operation time in the first loop (Loop1) and the first program suspend operation time in the second loop (Loop2).

For example, the resume operation time point for the second program suspend operation performed at the second program suspend operation time point PSP2 that is after the first program voltage PGM1 is applied may be after the first program voltage PGM1 is applied. For example, the programming operation after the second program suspend operation may be resumed from the program verification operation VFY1_1 following the application of the first program voltage PGM.

In addition, a resume operation time point for a plurality of third program suspend operations performed at a plurality of third program suspend operation time points PSP3 after the plurality of first program verify voltages VFY1_1, VFY1_2, and VFY1_3 are respectively applied may also be after the first program voltage PGM1 is applied. Similarly, the resume operation time point for the first program suspend operation performed at the first program suspend operation time point PSP1 after the second bit line setup voltage BLST2 is applied in the subsequent second loop Loop2 may also be after the first program voltage PGM1 is applied.

Accordingly, in a case in which the suspend operation is repeated at all suspend operation time points PSP1, PSP2, and PSP3, a problem which results from repeating the suspend operation within the same loop period may occur. The method of testing a suspend operation according to an example embodiment of the present inventive concept may prevent the above problem from occurring, by using the sequence operation circuit 212 included in the memory controller 200. For example, the sequence operation circuit 212 may control the suspend operation to be performed once at each of the first program suspend operation time point PSP1 and the plurality of third program suspend operation time points PSP3.

In the method of testing a suspend operation according to an example embodiment of the present inventive concept, the sequence operation circuit 212 included in the memory controller 200 stores information indicative of whether to perform the suspend operation, such that the suspend operation is not performed again at a time point at which the suspend operation has been performed among the plurality of suspend operation time points PSP1, PSP2, and PSP3.

In addition, the sequence operation circuit 212 may perform a read operation or a programming operation on a memory cell corresponding to a predetermined address during the suspend operation. Accordingly, when the suspend operation is not performed, a programming operation or a read operation for data retrieval may also be omitted.

Figure 11:
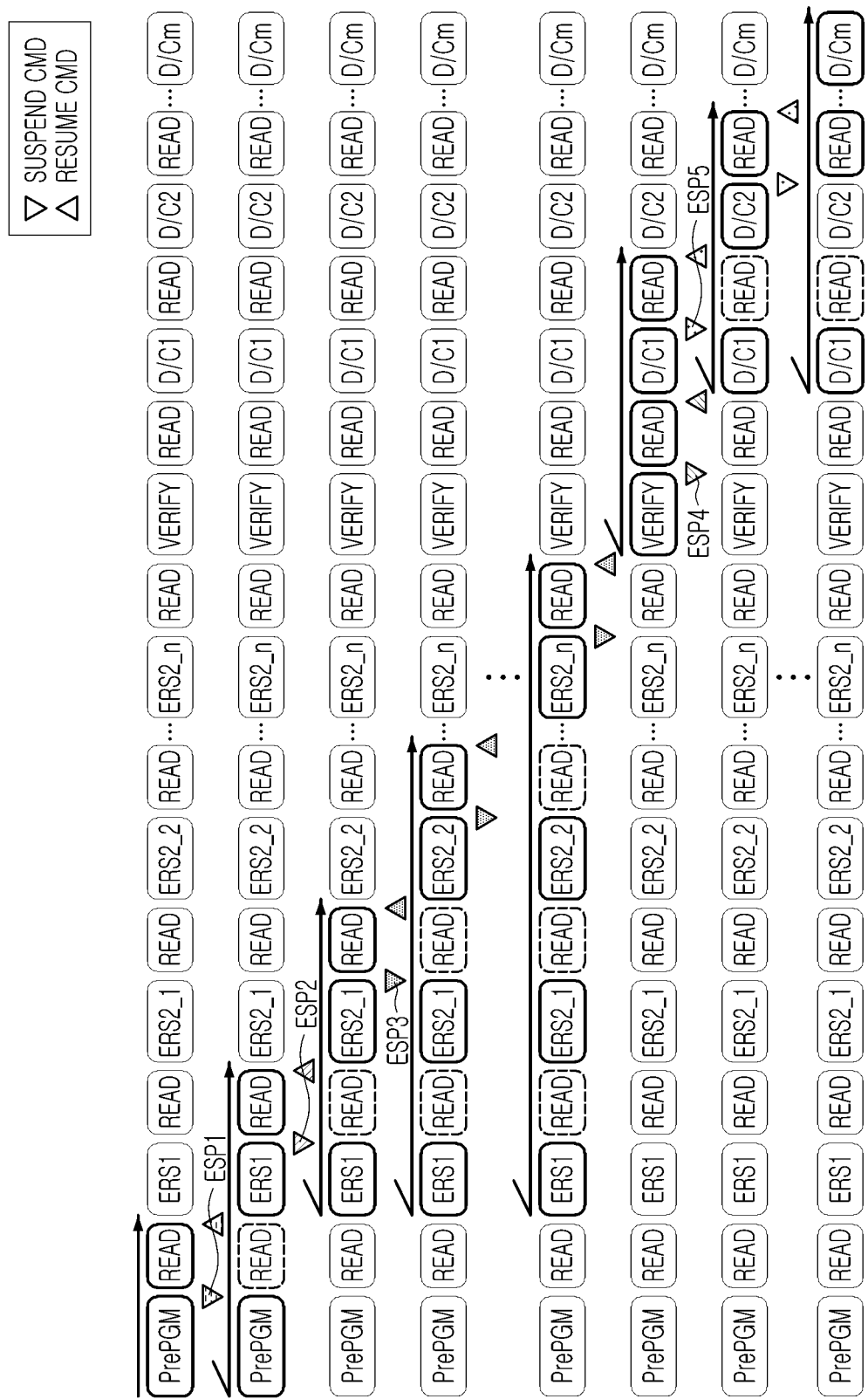
FIG. 11 is a diagram illustrating, by way of example, a case in which a method of testing a suspend operation according to an example embodiment of the present inventive concept is applied to an erase operation.

FIG. 11 is a diagram illustrating, by way of example, a case in which the method of testing a suspend operation according to an example embodiment of the present inventive concept is applied to an erase operation.

Referring to FIG. 11, the erase operation may include performing a pre-programming operation (PrePGM), performing a ramping operation (ERS1), applying an erase voltage (ERS2_1, ERS2_2, . . . , ERS2_n), applying an erase verification voltage (VERIFY), and executing an erasure defense code (D/C1, D/C2, . . . , D/Cm).

The time points of the suspend operation in the erase operation may include a first erase suspend operation time point ESP1, a second erase suspend operation time point ESP2, a plurality of third erase suspend operation time points ESP3, a fourth erase suspend operation time point ESP4, and a plurality of fifth erase suspend operation time points ESP5.

For example, the first erase suspend operation time point ESP1 may be after a pre-programming operation is performed. For example, at the first erase suspend operation time point ESP1 that is after performing the pre-programming operation and before performing the ramping operation, the memory controller 200 may apply an internal suspend command to the memory device 100 to perform a suspend operation.

The second erase suspend operation time point ESP2 may be after a ramping operation is performed. For example, at the second erase suspend operation time point ESP2 that occurs after gradually increasing the applied voltage for the erase operation and before the erase voltage is applied, the memory controller 200 may apply an internal suspend command to the memory device 100 to perform a suspend operation.

The plurality of third erase suspend operation time points ESP3 may be time points during application of the erase voltage. For example, at the third erase suspend operation time points ESP3, the memory controller 200 may apply an internal suspend command to the memory device 100 to perform the suspend operation.

The fourth erase suspend operation time point ESP4 may be after the erase verification voltage is applied. For example, at the fourth erase suspend operation time point ESP4 that occurs before the erasure defense code is executed and after the erase verification voltage is applied, the memory controller 200 may apply an internal suspend command to the memory device 100 to perform a suspend operation.

The plurality of fifth erase suspend operation time points ESP5 may be time points after the erasure defense code is executed. For example, at each of the fifth erase suspend operation time points ESP5 at which the memory cell is restored by executing the erasure defense code, the memory controller 200 may apply an internal suspend command to the memory device 100 to perform a suspend operation.

In the method of testing a suspend operation according to an example embodiment of the present inventive concept, in a plurality of respective loops constituting the erase operation, the resume operation time point corresponding to the second erase suspend operation and resume operation time points respectively corresponding to the plurality of third program suspend operations may be the same.

For example, the resume operation time for the second erase suspend operation performed at the second erase suspend operation time point ESP2 after the ramping operation is performed may occur after performing a pre-programming operation. For example, the erase operation after the second erase suspend operation may be resumed from the ramping operation following the pre-programming operation. In addition, a resume operation time point for a plurality of third erase suspend operations performed at the plurality of third erase suspend operation time points ESP3 that are time points during which the erase voltage is applied may also occur after the pre-programming operation is performed.

Furthermore, in the plurality of respective loops constituting the erase operation, resume operation time points corresponding to the plurality of fifth erase suspend operations may be the same. For example, the fifth erase suspend operation performed at the fifth erase suspend operation time points ESP5 after the erasure defense code is executed may be resumed from the first erasure defense code execution.

Accordingly, in the case of repeating the suspend operation at all suspend operation time points ESP), ESP2, and ESP3, a problem which results from repeating the suspend operation within the same loop section may occur. The method of testing a suspend operation according to an example embodiment of the present inventive concept may prevent the above problem from occurring, by using the sequence operation circuit 212 included in the memory controller 200. For example, the sequence operation circuit 212 may perform a control operation such that the suspend operation is performed once at each of the first erase suspend operation time point ESP1, the second erase suspend operation time point ESP2, the plurality of third erase suspend operation time points ESP3, and the plurality of fifth erase suspend operation time points ESP5.

In the method of testing a suspend operation according to an example embodiment of the present inventive concept, the sequence operation circuit 212 included in the memory controller 200 stores information indicative of whether to perform the suspend operation, thereby effectuating control such that the suspend operation is not performed again at a time point at which the suspend operation has already been performed among the plurality of suspend operation time points ESP1, ESP2, and ESP3.

In addition, the sequence operation circuit 212 may perform a read operation or a programming operation on a memory cell corresponding to a predetermined address during the suspend operation. Accordingly, when the suspend operation is not performed, a read operation or a programming operation for data retrieval may also be omitted.

Figure 12A:
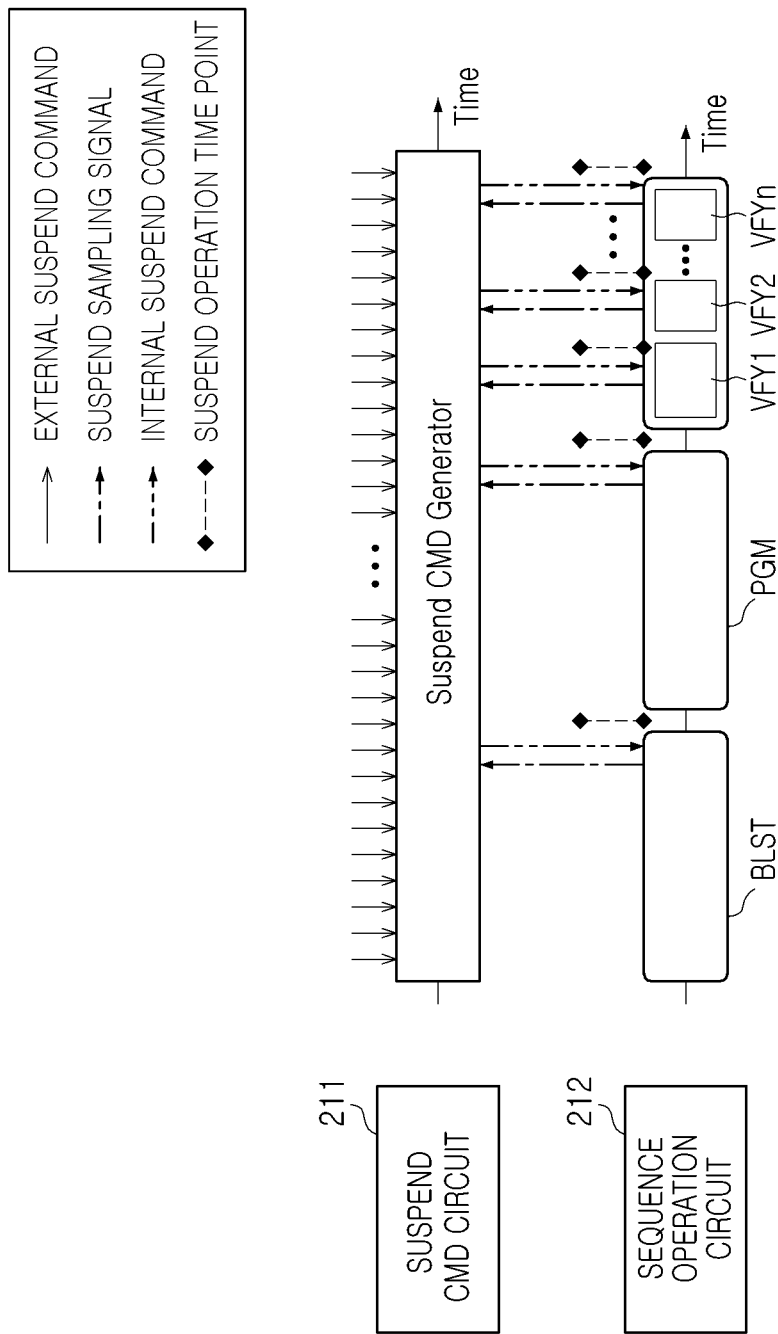
FIGS. 12A and 12B are diagrams illustrating a method of testing a suspend operation during a programming operation and an erase operation, respectively, according to an example embodiment of the present inventive concept.
Figure 12B:
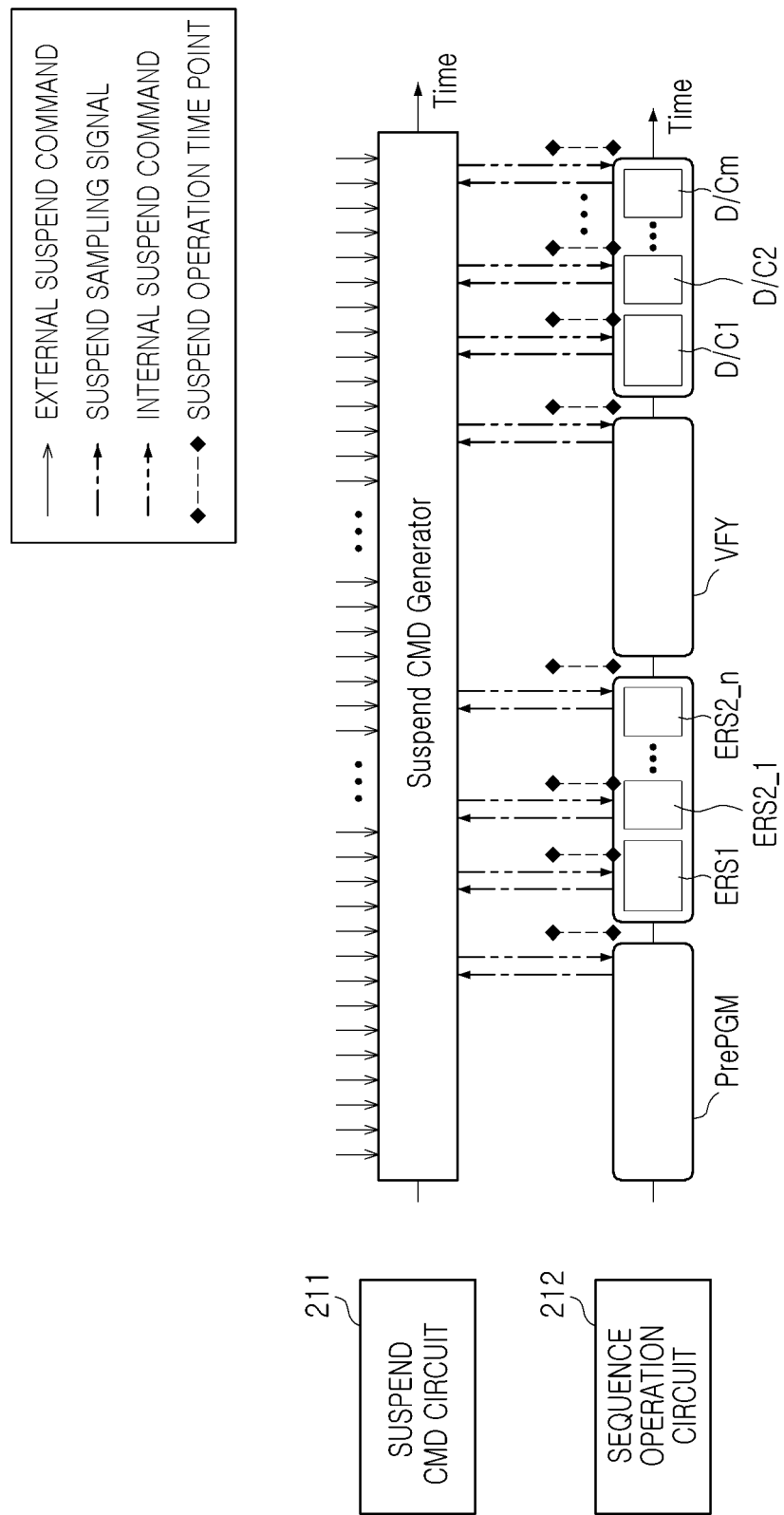

FIGS. 12A and 12B are diagrams illustrating a method of testing a suspend operation during a programming operation and an erase operation, respectively, according to an example embodiment of the present inventive concept.

FIG. 12A may be a diagram illustrating a signal transferred between the suspend command circuit 211 and the sequence operation circuit 212 during a programming operation, and FIG. 12B may be a diagram illustrating a signal transmitted between the suspend command circuit 211 and the sequence operation circuit 212 during an erase operation.

Referring to FIGS. 12A and 12B, a plurality of suspend operation time points may be respectively stored in the sequence operation circuit 212. The sequence operation circuit 212 may determine whether to transmit a suspend sampling signal to the suspend command circuit 211 at a point in time before each of a plurality of stored suspend operation time points.

The suspend sampling signal may be determined according to whether the suspend operation has been performed at a corresponding suspend operation time point. For example, when the suspend operation has already been performed at a certain suspend operation time point, the sequence operation circuit 212 may not transmit the suspend sampling signal to the suspend command circuit 211. On the other hand, when the suspend operation has not yet been performed at a certain suspend operation time, the sequence operation circuit 212 may transmit the suspend sampling signal to the suspend command circuit 211.

The suspend command circuit 211 may receive a plurality of external suspend operation commands from the outside. The suspend command circuit 211 may selectively generate an internal suspend operation command based on a plurality of input external suspend operation commands and a suspend sampling signal from the sequence operation circuit 212. The suspend command circuit 211 may transmit the generated internal suspend operation command to the sequence operation circuit 212.

The method of testing a suspend operation according to an example embodiment of the present inventive concept may perform a suspend operation for all suspend operation time points based on the transmitted internal suspend operation command, and may determine whether the suspend operation is effectively performed.

A plurality of points in time at which the suspend operation is performed may be different from each other in FIGS. 12A and 12B. However, this is only a difference depending on whether the suspend operation is performed during the programming operation or the suspend operation is performed during the erase operation, and the mechanism of the method of testing a suspend operation may be the same in FIGS. 12A and 12B.

Figure 13:
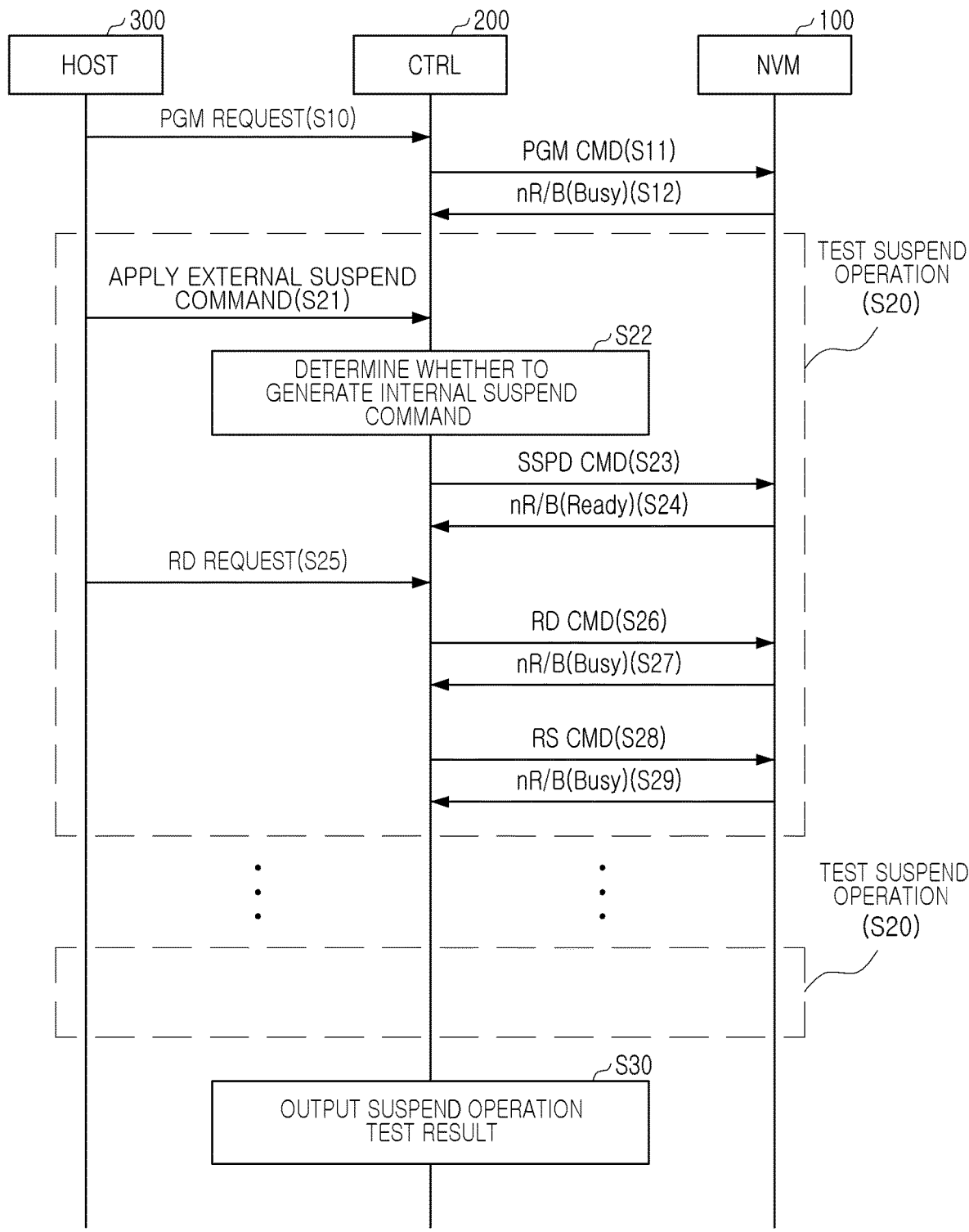
FIG. 13 is a diagram illustrating a method of testing a suspend operation according to an example embodiment of the present inventive concept during a programming operation.

FIG. 13 is a diagram illustrating a method of testing a suspend operation according to an example embodiment of the present inventive concept during a programming operation.

Referring to FIG. 13, a method of testing a suspend operation according to an example embodiment of the present inventive concept may be started when a programming operation request is transmitted from the host 300 to the memory controller 200 (S10). However, this is only an example embodiment and the present inventive concept is not limited thereto. For example, the method of testing a suspend operation according to an example embodiment of the present inventive concept may be started when an erase operation request is transmitted from the host 300 to the memory controller 200.

The memory controller 200 may input the programming command PGM CMD to the memory device 100 (S11), and the memory device 100 may output the ready/busy output signal nR/B in the busy state to the controller 200 while performing the programming operation (S12).

While the programming operation is being performed, the suspend operation determination according to an example embodiment of the present inventive concept may be performed (S20). As an example, the suspend operation test may be repeatedly performed at all suspend operation time points, and the memory controller 200 may output a result of the repeatedly performed suspend operation test (S30).

The suspend operation determination may be performed based on the suspend operation by an external suspend command applied from the host 300 (S21). In this case, the external suspend command may be a command signal repeatedly applied to the memory controller 200 instead of being applied to the memory controller 200 by a specific signal.

The sequence operation circuit 212 included in the memory controller 200 may determine whether to generate the internal suspend command SSPD CMD based on a previously stored suspend operation time point (S22). For example, the sequence operation circuit 212 transmits the suspend sampling signal to the suspend command circuit 211 at a point in time before the suspend operation time, and the suspend command circuit 211 may transmit the internal suspend command SSPD CMD to the sequence operation circuit 212 based on the suspend sampling signal.

The memory controller 200 may apply the generated internal suspend command SSPD CMD to the memory device 100. The memory device 100 may perform a suspend operation based on the internal suspend command SSPD CMD and stop a programming operation in progress.

Accordingly, the memory device 100 may output the ready/busy output signal nR/B in the ready state to the memory controller 200 (S24).

In addition, during the suspend operation, the host 300 may request a read operation for data retrieval from the memory controller 200 (S25), and based on this request, the memory controller 200 may apply a read command RD CMD to the memory device 100 (S26). However, this is only an example embodiment and the present inventive concept is not limited thereto. For example, the read command RD CMD for performing the read operation may be automatically generated by the memory controller 200 and applied to the memory device 100.

The memory device 100 may perform a read operation based on the read command RD CMD. Accordingly, the memory device 100 may output the ready/busy output signal nR/B in the busy state to the memory controller 200 (S27).

When the read operation is completed, the memory controller 200 may automatically apply the resume command RS CMD to the memory device 100 (S28). The memory device 100 may perform a resume operation based on the resume command RS CMD and may resume a programming operation in progress. Accordingly, the memory device 100 may output the ready/busy output signal nR/B in the busy state to the memory controller 200 (S29).

Figure 14:
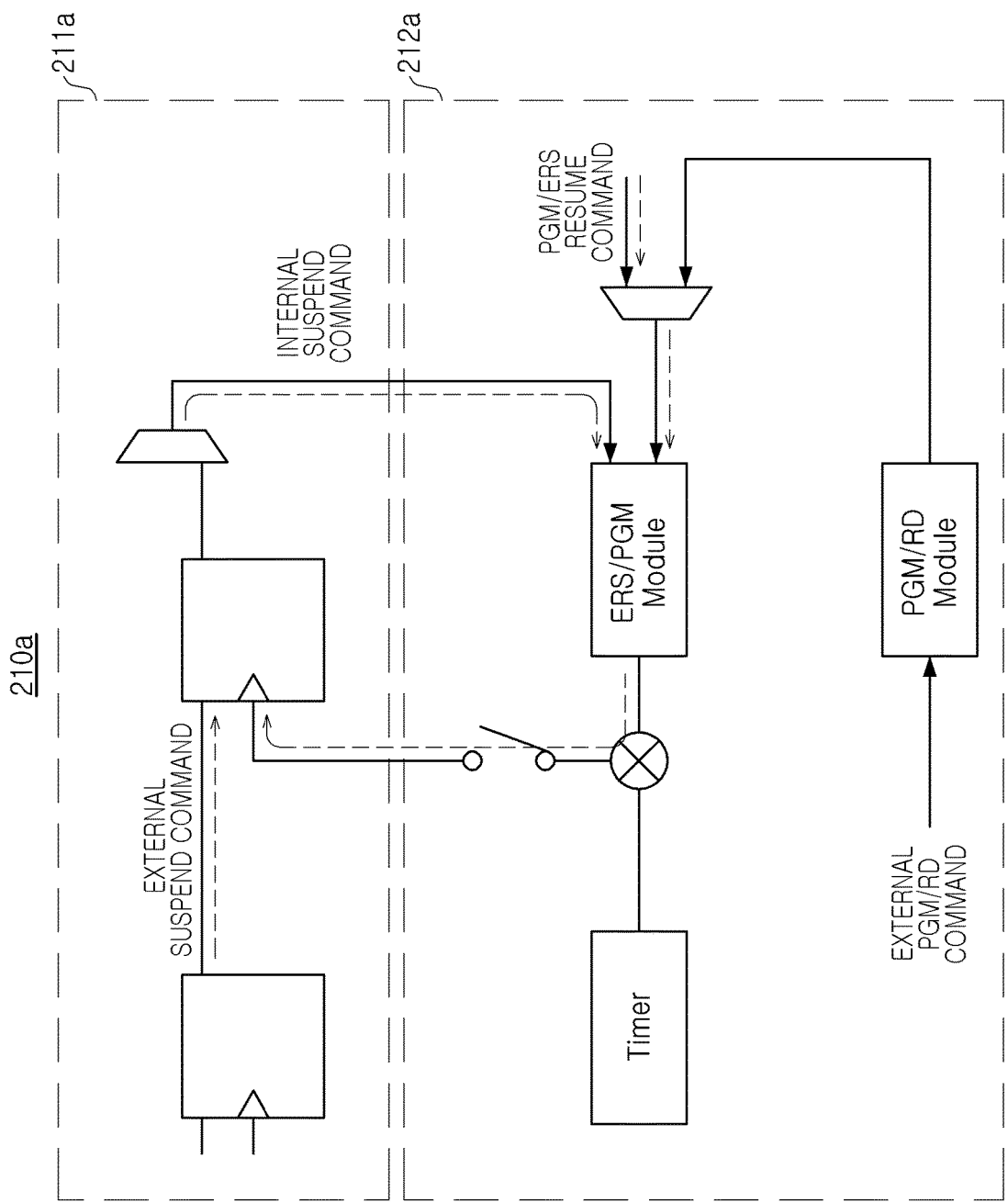
FIG. 14 is a circuit diagram illustrating a general suspend operation.
Figure 15:
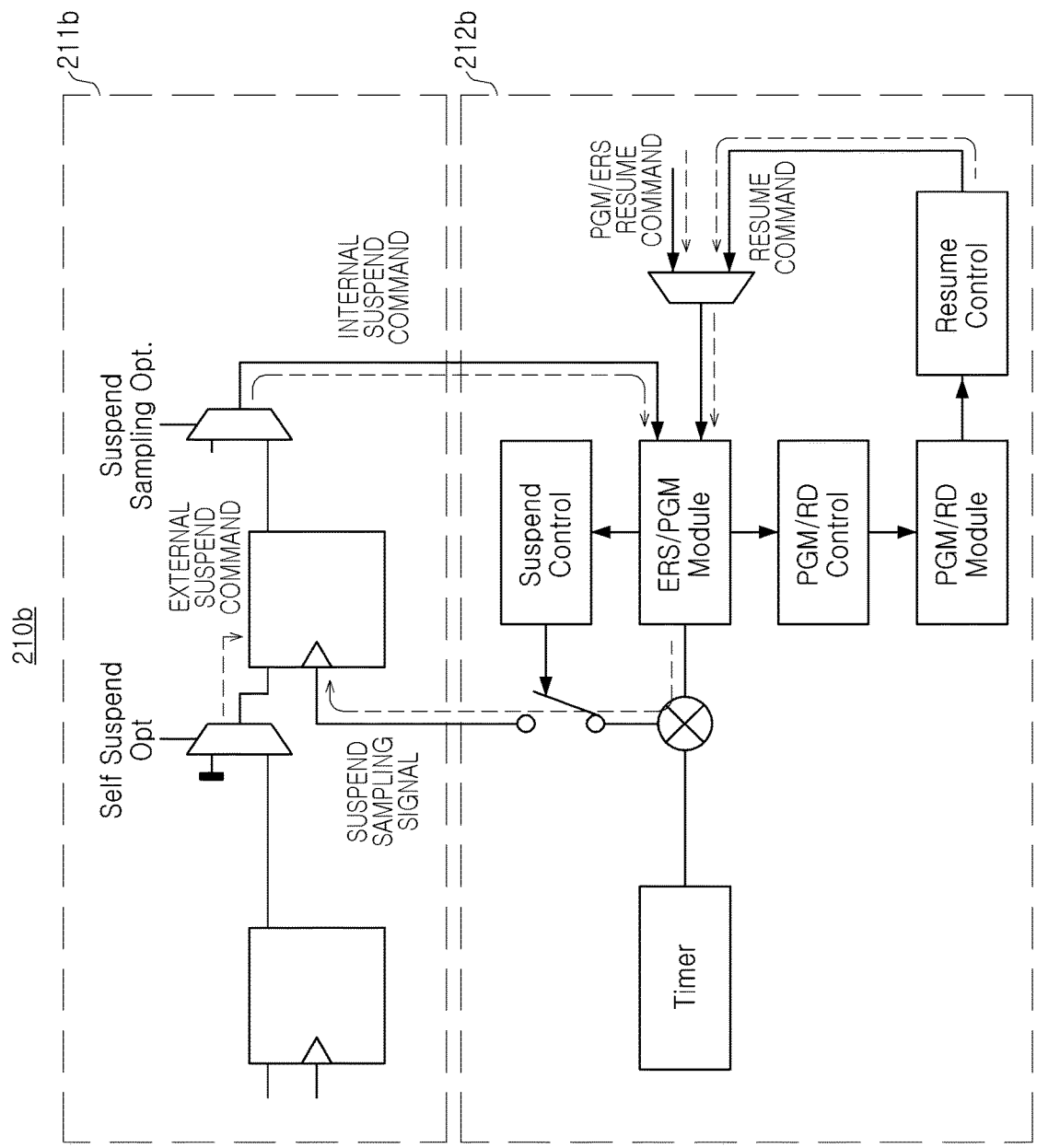
FIG. 15 is a circuit diagram illustrating a method of testing a suspend operation according to an example embodiment of the present inventive concept.

FIG. 14 is a circuit diagram illustrating a general suspend operation. FIG. 15 is a circuit diagram illustrating a method of testing a suspend operation according to an example embodiment of the present inventive concept.

Referring to FIG. 14, a suspend circuit 210a for performing a general suspend operation may include a suspend command circuit 211a and a sequence operation circuit 211b. On the other hand, referring to FIG. 15, in the method of testing a suspend operation according to an example embodiment, a suspend/resume test circuit 210b may include a suspend command circuit 211b and a sequence operation circuit 212b.

Referring to FIG. 14, the memory controller 200 may perform a program/erase operation on the memory device 100 by applying a program/erase command to the memory device 100. On the other hand, during a program/erase operation, the suspend command circuit 211a may receive an external suspend command from the outside, and generate an internal suspend command based thereon. The suspend command circuit 211a may apply the generated internal suspend command to the sequence operation circuit 212a.

The sequence operation circuit 212a may perform a suspend operation on the memory cells that are in the program/erase operation based on the applied internal suspend command, and may perform a program/read operation.

However, unlike the suspend/resume test circuit 210b to which the method of testing a suspend operation according to an example embodiment of the present inventive concept is applied, the suspend operation may be performed only at some suspend time points. For example, the suspend time points at which the suspend operation is performed may be determined by a timer.

In addition, the program/read operation performed by the sequence operation circuit 212a may be based on an externally applied external program/read command. For example, the external program/read command may be applied to a program/read module in the suspend circuit 210a. After the program/read operation during the suspend operation is completed, the sequence operation circuit 212a may perform a resume operation based on the program/erase resume command and continue to perform the program/erase operation. The program/erase resume command may be provided to an erase/program module in the suspend circuit 201a.

Referring to FIG. 15, in the suspend/resume test circuit 210b to which the method of testing a suspend operation according to an example embodiment of the present inventive concept is applied, the suspend command circuit 211b and the sequence operation circuit 212b may correspond to the suspend command circuit 211a and the sequence operation circuit 212a illustrated in FIG. 14. However, the suspend/resume test circuit 210b may be controlled to perform the suspend operation at all suspend operation time points, and may be controlled to automatically perform a program/read operation performed during the suspend operation and/or a resume operation after the program/read operation.

For example, the sequence operation circuit 212b may include a suspend control circuit that stores all the suspend operation time points, and suspend operation time points at which the suspend operation has been performed. The suspend control circuit may be used to determine whether to transmit the suspend sampling signal generated in response to all suspend operation time points to the suspend command circuit 211b, based on whether the suspend operation has been performed at the time of the corresponding suspend operation. The suspend control circuit may close a switch at its output to transfer the suspend sampling signal to the suspend command circuit 211b.

In addition, the suspend command circuit 211b may generate an internal suspend command based on the applied suspend sampling signal and transmit the generated internal suspend command to the sequence operation circuit 212b. Accordingly, by omitting the suspend operation at the suspend operation time point at which the suspend operation has been performed, the suspend operation may be performed at all suspend operation timings without having to repeat the program/erase operation in a certain section. In addition, the suspend command circuit 211b may include a pair of flip flops. For example, one of the flip-flops may be configured to receive the suspend sampling signal from the sequence operation circuit 212b. Furthermore, the suspend command circuit 211b may include a first multiplexer coupled between the flip flops and configured to receive a self suspend signal and a second multiplexer coupled to an output of one of the flip flops and configured to receive the suspend sampling signal.

In addition, the sequence operation circuit 212b may further include a programming/read control circuit that designates the address of a memory cell to automatically perform a program/read operation during a suspend operation. The sequence operation circuit 212b may further include a resume control circuit that generates a resume command for automatically performing a resume operation after a program/read operation.

Figure 16:
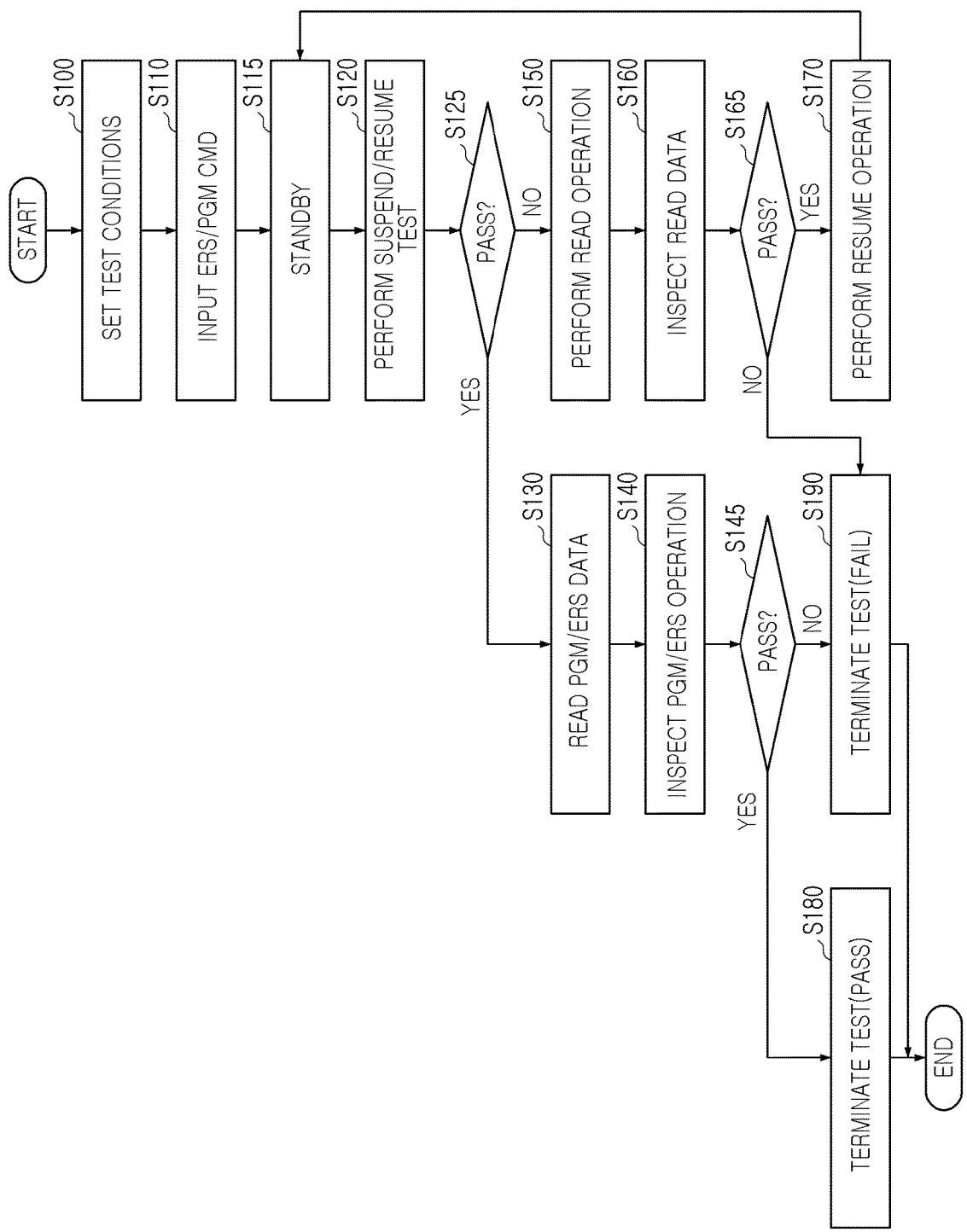
FIG. 16 is a flowchart illustrating a method of testing a suspend operation according to an example embodiment of the present inventive concept.

FIG. 16 is a flowchart illustrating a method of testing a suspend operation according to an example embodiment of the present inventive concept.

Referring to FIG. 16, it is determined whether a circuit for performing the suspend operation and the resume operation is defective using the method of testing a suspend operation according to an example embodiment of the present inventive concept, and the memory device 100 in which the defect has occurred may be found in advance.

Before actually performing a method of testing a suspend operation, a memory cell to perform a programming operation and an erase operation may be designated, and whether to automatically perform a resume operation after a read operation and a suspend operation on a designated memory cell may be set (S100). In other words, the test conditions may be set. However, this is only an example embodiment and the present inventive concept is not limited thereto. For example, various test conditions may be set in advance before performing the method of testing a suspend operation may be preset.

After setting the test condition, the memory controller 200 may apply a programming command or an erase command to the memory device 100 (S110). Based on the applied command, the memory device 100 may perform a programming operation or an erase operation, and while the programming operation or the erase operation is being performed, a plurality of suspend operations may be performed by the method of testing a suspend operation according to an example embodiment of the present inventive concept (S115).

For example, the sequence operation circuit 212b may transmit the suspend sampling signal to the suspend command circuit 211b to perform the suspend operation once at all suspend operation timings using the suspend control circuit. On the other hand, the memory controller 200 may check whether the suspend operation is effectively completed at all suspend operation time points, using an internal suspend command generated based on the suspend sampling signal (S120). Here, the internal suspend command may be generated by the suspend command circuit 211b.

When the suspend operation is effectively completed at all suspend operation timings (S125), an operation of reading data stored in the memory cell may be performed to determine whether a programming operation or an erase operation performed on the memory cell has been properly performed (S130). In this case, it may be checked in S140 whether the operation by the programming command or the device command applied to the memory device 100 in operation S110 has been effectively performed.

When the operation by the programming command or the device command applied to the memory device 100 has been effectively performed (S145), it may be determined that the plurality of circuits for performing the suspend operation and the resume operation and the circuits for performing the operation of the memory device 100 all normally operate, and the suspend operation test may be terminated (S180). In other words, these circuits may be determined to pass.

On the other hand, when the operation by the programming command or the device command applied to the memory device 100 is not effectively performed (S145), it may be determined that at least a portion of the plurality of circuits for performing the operation of the memory device 100 are defective, and the suspend operation test may be terminated (S190). In other words, these circuits may be determined to fail.

On the other hand, when the suspend operation is not effectively completed at all suspend operation timings (S125), the memory cells may be in a state in which a programming operation or an erase operation is stopped by the suspend operation. Therefore, to determine whether a programming operation or an erase operation performed on the memory cell is properly performed, an operation for reading data stored in the corresponding memory cell may be performed (S150). Therefore, it may be checked whether the operation by the programming command or the device command applied to the memory device 100 in operation S110 is being effectively performed (S160).

When the operation by the programming command or the device command applied to the memory device 100 is being effectively performed (S165), it is determined that there is a problem in a portion of the plurality of circuits performing the suspend operation and the resume operation. In this case, by performing the resume operation, a plurality of suspend operations according to the method of testing a suspend operation according to an example embodiment of the present inventive concept may be performed again (S170).

On the other hand, when the operation by the programming command or the device command applied to the memory device 100 is not effectively performed (S165), it may be determined that at least a portion of the plurality of circuits for the operation of the memory device 100 are defective, and the suspend operation test may be terminated (S190).

It is to be understood that operations S100 to S190 illustrated in FIG. 16 are merely illustrative examples and the present inventive concept may not be particularly limited. For example, another operation may be added to the method of testing a suspend operation according to an example embodiment of the present inventive concept, or some operations of S100 to S190 may be omitted. In addition, the read command for performing the operations of S150 to S170 may be applied from the outside, or may be applied internally.

Figure 17:
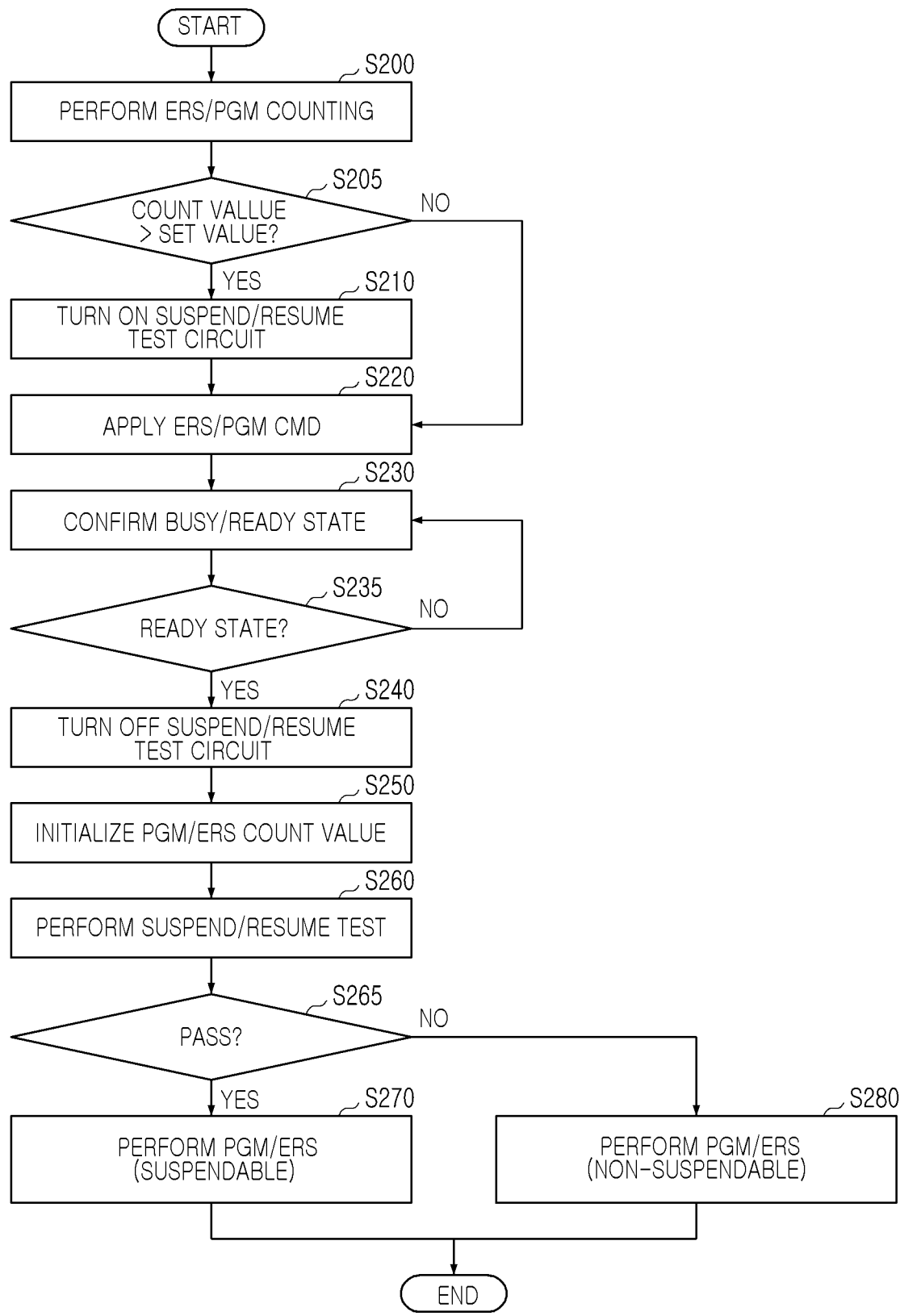
FIGS. 17 and 18 are flowcharts illustrating a process of inspecting the state of a peripheral circuit area using a method of testing a suspend operation according to an example embodiment of the present inventive concept.
Figure 18:
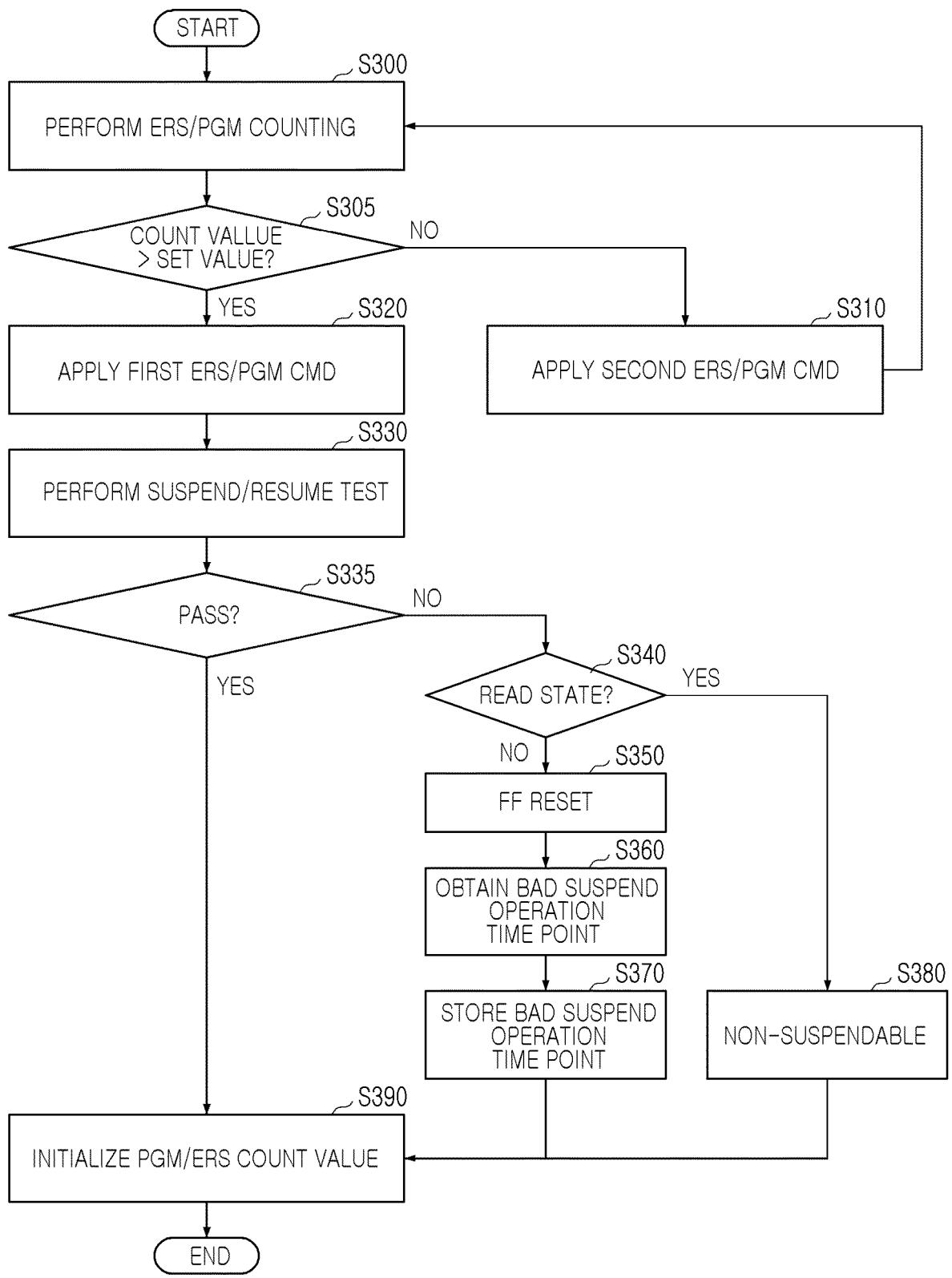

FIGS. 17 and 18 are flowcharts illustrating a process of inspecting the state of a peripheral circuit area using a method of testing a suspend operation according to an example embodiment of the present inventive concept.

Referring to FIG. 17, the method of testing a suspend operation according to an example embodiment of the present inventive concept is applied to the memory device 100 that performs a plurality of programming operations and/or erase operations, and states of a plurality of circuits included in the peripheral circuit area included in the memory device 100 may be checked.

Before applying the method of testing a suspend operation, the number of test cycles for performing the suspend test on the memory device 100 including the memory cell area and the peripheral circuit area may be set. Thereafter, a programming operation or an erase operation may be continuously performed on the memory cell area, and the number of times of the programming operation or the erase operation may be counted (S200).

In the method of testing a suspend operation according to an example embodiment of the present inventive concept, the number of times a programming operation or an erase operation is performed on the memory cell area, for example, the count value and the preset number of inspection cycles may be compared (S205). In other words, the count value of the number of programming operations may be compared to a preset number, and similarly, the count values of the number of erase operations may be compared to a preset number.

When the count value is less than or equal to the set value of the number of test cycles, a program/erase command on the memory cell area may be applied to continuously perform a programming operation or an erase operation (S220).

On the other hand, when the count value is greater than the set value of the number of test cycles, the memory controller 200 may activate the suspend/resume test circuit 210 (S210) and apply a program/erase command for the application of the method of testing a suspend operation (S220). The memory controller 200 may perform the suspend operation for all suspend operation time points included in the subsequent operation.

When the suspend operation is completed, the ready/busy signal nR/B output from the memory device 100 may be in a ready state. Accordingly, the memory controller 200 may determine the ready/busy state of the memory device 100

(S230). For example, when the memory device 100 is in the busy state (S235), since the suspend operation is not completed, operation S230 may be repeatedly performed until the ready state is confirmed.

When it is confirmed that the memory device 100 is in the ready state, since the suspend operation has been completed, the suspend/resume test circuit 210 may be deactivated (S240), and the count value of the programming operation or the erase operation may be initialized (S250).

The memory controller 200 may perform a suspend/resume check for determining whether the suspend operation has been effectively performed based on the suspend operation performed in operations S210 to S240 (S260).

In the method of testing a suspend operation according to an example embodiment of the present inventive concept, it may be determined whether to perform the suspend operation in the peripheral circuit area based on the result of the suspend-resume inspection. As an example, when the suspend operation is effectively performed (S265), a suspend operation may be performed in subsequent operations for the corresponding memory device 100 (S270). On the other hand, when the suspend operation is not effectively performed (S265), the suspend operation may no longer be performed in subsequent operations on the corresponding memory device 100 (S280).

Referring to FIG. 18, operations S300 and S305 may correspond to operations S200 and S205 illustrated in FIG. 17. However, in the method of testing a suspend operation according to the example embodiment of the present inventive concept illustrated in FIG. 18, the suspend/resume test may be performed by separately applying the programming command or the erase command (S330) instead of activating the suspend/resume test circuit 210.

For example, when the count value is greater than the set value of the number of test cycles (S305, YES), a first command including commands for a suspend operation and a resume operation may be applied to the memory device 100 (S320). On the other hand, when the count value is less than or equal to the set value of the number of test cycles (S305, NO), a second command for continuously performing a programming operation or an erase operation may be applied to the memory device 100 (S310). Both the first command and the second command may be a programming command or an erase command.

As a result of performing the suspend/resume check, when all suspend and resume operations are validly performed (S335), it may be determined that the plurality of circuits for performing the suspend operation and the resume operation and the circuits for the operation of the memory device 100 all normally operate, and after initializing the count value, the suspend operation test may be terminated (S390).

On the other hand, when the suspend operation and the resume operation are not effectively performed and the suspend state continues at any one time point (S340), it may be determined that a malfunction has occurred in the suspend operation at the point in time at which the suspend state continues, and the flip-flop included in the suspend/resume test circuit 210 may be reset (S350). The suspend/resume test circuit 210 may acquire a defective suspend operation time point (S360) and store the acquired operation time point (S370). In other words, the suspend/resume test circuit 210 may obtain and store a bad suspend operation time point. The suspend/resume test circuit 210 may perform a control such that the suspend operation is not performed at the time point of the defective suspend operation in program/erase operations after the count value is initialized (S390).

In addition, when the suspend operation is not effectively performed even after all the suspend operations have been completed (S340), the suspend/resume test circuit 210 may control the suspend operation not to be performed any longer at all suspend operation time points (S380).

As set forth above, in a method of testing a suspend operation according to an example embodiment of the present inventive concept, whether all circuits performing the suspend operation and/or the resume operation are defective may be tested.

In a method of testing a suspend operation according to an example embodiment of the present inventive concept, by determining whether a circuit performing the suspend operation and/or the resume operation is defective, the suspend operation and/or the resume operation may be selectively performed.

While example embodiments of the present inventive concept have been illustrated and described above, it will be apparent to those skilled in the art that modifications and variations could be made thereto without departing from the scope of the present inventive concept as set forth by the appended claims.

What is claimed is:

1. A method of testing a suspend operation, the method comprising:
   determining whether to transfer a suspend sampling signal to a suspend command circuit at a time point prior to each of a plurality of suspend operation time points stored in a sequence operation circuit;
   transferring the suspend sampling signal from the sequence operation circuit to the suspend command circuit;
   generating an internal suspend operation command based on the suspend sampling signal;
   transferring the internal suspend operation command from the suspend command circuit to the sequence operation circuit;
   performing suspend operations for all the plurality of suspend operation time points in response to the internal suspend operation command; and
   determining whether the suspend operations are performed at all of the suspend operation time points.

2. The method of claim 1, wherein the sequence operation circuit outputs a command for performing a programming operation or a read operation on a memory cell corresponding to a predetermined address, using a program/read control circuit, while performing the suspend operation.

3. The method of claim 2, wherein the sequence operation circuit outputs a resume command using a resume control circuit after performing the programming operation or the read operation.

4. The method of claim 1, wherein a time interval between the suspend operations performed at all of the suspend operation time points is not constant.

5. The method of claim 1, wherein a programming operation includes a plurality of loops, and all of the suspend operation time points in each of the plurality of loops during an execution of the programming operation includes a first program suspend operation time point, a second program suspend operation time point, and a plurality of third program suspend operation time points, and
   the first program suspend operation time point is after a bit line setup is performed, the second program suspend operation time point is after a program voltage is applied, and each of the plurality of third program suspend operation time points is after at least one of a plurality of program verification operations is performed.

6. The method of claim 5, wherein a resume operation time point corresponding to the second program suspend operation time point and resume operation time points corresponding to the plurality of third program suspend operation time points, respectively, in any one of the plurality of loops, and a resume operation time point corresponding to the first program suspend operation in a subsequent loop are identical to each other.

7. The method of claim 5, wherein the sequence operation circuit includes a suspend control circuit for controlling the suspend operation to be performed once at each of the first program suspend operation time point and the plurality of third program suspend operation time points.

8. The method of claim 1, wherein an erase operation includes a plurality of loops, and all of the suspend operation time points in each of the plurality of loops during the erase operation include a first erase suspend operation time point, a second erase suspend operation time point, a plurality of third erase suspend operation time points, a fourth erase suspend operation time point, and a plurality of fifth erase suspend operation time points, and
the first erase suspend operation time point is after a pre-programming operation, the second erase suspend operation time point is after a ramping operation, each of the plurality of third erase suspend operation time points is a time point when an erase voltage is applied, the fourth erase suspend operation time point is after an erase verification operation is performed, and the plurality of fifth erase suspend operation time points are after a defense code is executed.

9. The method of claim 8, wherein in any one of the plurality of loops, a resume operation time point corresponding to the second erase suspend operation time point and resume operation time points corresponding to the plurality of third erase suspend operations, respectively, are identical to each other.

10. The method of claim 8, wherein in any one of the plurality of loops, resume operation time points corresponding to the plurality of fifth erase suspend operations, respectively, are identical to each other.

11. The method of claim 8, wherein the sequence operation circuit includes a suspend control circuit for controlling the suspend operation to be performed once at each of the first erase suspend operation time point, the second erase suspend operation time point, the plurality of third erase suspend operation time points, and the plurality of fifth erase suspend operation time points.

12. A method of testing a suspend operation, comprising:
designating a memory cell to perform a programming operation and an erase operation, and determining whether to automatically perform a resume operation after a read operation and the suspend operation on the memory cell;
applying a programming command or an erase command;
transferring a suspend sampling signal to a suspend command circuit to perform the suspend operation once at each of all suspend operation time points by using a suspend control circuit included in a sequence operation circuit;
determining whether the suspend operation is completed at all of the suspend operation time points, using an internal suspend command generated based on the suspend sampling signal; and
reading data stored in the memory cell.

13. The method of claim 12, further comprising reading the data stored in the memory cell and determining whether an operation according to the programming command or the erase command is performed, when the suspend operation is completed at all of the suspend operation time points.

14. The method of claim 12, further comprising reading the data stored in the memory cell and determining whether the data stored in the memory cell is read when the suspend operation is not completed at all of the suspend operation time points.

15. The method of claim 14, further comprising determining again whether the suspend operation is completed at suspend operation time points after a resume operation is resumed, when the data stored in the memory cell is read.

16. A method of testing a suspend operation, comprising:
setting a number of test cycles to perform a suspend test on a memory device including a memory cell area and a peripheral circuit area;
performing a programming operation or an erase operation on the memory cell area;
comparing the set number of test cycles with a number of the programming operation or the erase operation;
performing the suspend test for all suspend operation time points included in a subsequent operation when the number of the programming operation or the erase operation is greater than the number of test cycles; and
determining whether to perform the suspend operation in the peripheral circuit area based on a result of the suspend test.

17. The method of claim 16, wherein a sequence operation circuit and a suspend command circuit used to perform the suspend test are activated when the number of the programming operation or the erase operation is greater than the number of the test cycles.

18. The method of claim 16, wherein, when the number of the programming operation or the erase operation is greater than the number of the test cycles, a first command different from a second command for instructing the programming operation or the erase operation on the memory cell area is applied to perform a subsequent programming operation or erase operation.

19. The method of claim 18, wherein, when a suspend state continues at any one time point among all of the suspend operation time points, the suspend operation is controlled so as not to be performed any longer at the any one time point.

20. The method of claim 16, wherein, when suspend operations are not performed at all of the suspend operation time points, the suspend operations are controlled so as not to be performed any longer at all the suspend operation time points.

* * * * *